(12) United States Patent
Ono et al.

(10) Patent No.: US 12,486,851 B2
(45) Date of Patent: Dec. 2, 2025

(54) VACUUM PUMP

(71) Applicant: Edwards Japan Limited, Yachiyo (JP)

(72) Inventors: Takaaki Ono, Yachiyo (JP); Katsuhisa Yokozuka, Yachiyo (JP)

(73) Assignee: Edwards Japan Limited, Yachiyo (JP)

(*) Notice: Subject to any disclaimer, the term of this patent is extended or adjusted under 35 U.S.C. 154(b) by 80 days.

(21) Appl. No.: 18/563,762

(22) PCT Filed: Jun. 9, 2022

(86) PCT No.: PCT/JP2022/023381
§ 371 (c)(1),
(2) Date: Nov. 22, 2023

(87) PCT Pub. No.: WO2022/264924
PCT Pub. Date: Dec. 22, 2022

(65) Prior Publication Data
US 2024/0369064 A1 Nov. 7, 2024

(30) Foreign Application Priority Data
Jun. 18, 2021 (JP) ................. 2021-101957

(51) Int. Cl.
*F04D 19/04* (2006.01)
*F04D 25/06* (2006.01)
(Continued)

(52) U.S. Cl.
CPC ........... *F04D 19/048* (2013.01); *F04D 25/06* (2013.01); *F04D 27/001* (2013.01); *F04D 29/048* (2013.01); *F04D 29/584* (2013.01)

(58) Field of Classification Search
CPC ..... F04D 19/042; F04D 19/044; F04D 29/048
See application file for complete search history.

(56) References Cited

U.S. PATENT DOCUMENTS

2003/0161733 A1\* 8/2003 Kabasawa ............... F04D 25/06
417/423.4
2014/0219841 A1 8/2014 Kozaki
(Continued)

FOREIGN PATENT DOCUMENTS

EP 2952743 A1 12/2015
EP 3653883 A1 5/2020
(Continued)

OTHER PUBLICATIONS

CD-ROM of the specification and drawings annexed to the request of Japanese Utility Model Application No. 058093/1991 (Laid-open No. 021691/1993) Shimadzu Corp.), No translation available, Feb. 19, 1993, 10 Pages.

(Continued)

*Primary Examiner* — Kenneth J Hansen
(74) *Attorney, Agent, or Firm* — Shumaker & Sieffert, P.A.

(57) ABSTRACT

A vacuum pump, which prevents adhesion of products even when a rotating body is stopped, by heating the rotating body using an alternating current (AC) magnetic field. Two heating electromagnets are disposed facing each other across a rotating body. The heating electromagnets receive a supply of AC electric current from a heating electric power source. Excitation of the heating from this AC electric current generates an AC magnetic field. The generated AC magnetic field intersects with the rotating body. Eddy current is generated around the intersecting AC magnetic field. The rotating body is heated by this eddy current. This heating enables deposition of products to be prevented even further, and realize improved pump operation efficiency.

12 Claims, 18 Drawing Sheets

(51) Int. Cl.
*F04D 27/00* (2006.01)
*F04D 29/048* (2006.01)
*F04D 29/58* (2006.01)

(56) References Cited

U.S. PATENT DOCUMENTS

| | | |
|---|---|---|
| 2016/0025096 A1 | 1/2016 | Shi et al. |
| 2016/0252099 A1 | 9/2016 | Kawashima |
| 2017/0184113 A1 | 6/2017 | Moriyama |
| 2018/0279415 A1 | 9/2018 | Moriyama |
| 2019/0249677 A1* | 8/2019 | Kozaki ............... F16C 32/0451 |

FOREIGN PATENT DOCUMENTS

| | | |
|---|---|---|
| GB | 2119609 A | 11/1983 |
| JP | S5932697 A | 2/1984 |
| JP | H01130096 U | 9/1989 |
| JP | 2018204441 A | 12/2018 |
| WO | 2014119191 A1 | 8/2014 |

OTHER PUBLICATIONS

International Search Report and Written Opinion of International Application No. PCT/JP2022/023381, dated Aug. 30, 2022, 9 Pages.

Microfilm of the specification and drawings annexed to the request of Japanese Utility Model Application No. 026978/1988 (Laid-open No. 130096/1989) (Shmadzu Corp.) and Machine Translation, Sep. 5, 1989, 18 Pages.

Extended Search Report from counterpart European Application No. 22824914.0, dated Apr. 29, 2025, 8 Pages.

* cited by examiner

⊙ AND ⊗ REPRESENT DIRECTION OF ELECTRIC CURRENT FLOWING THROUGH COIL
⊙ REPRESENTS FROM FAR SIDE OF PLANE OF DRAWING TO NEAR SIDE
⊗ REPRESENTS FROM NEAR SIDE OF PLANE OF DRAWING TO FAR SIDE

⊙ AND ⊗ REPRESENT DIRECTION OF ELECTRIC CURRENT FLOWING THROUGH COIL
⊙ REPRESENTS FROM FAR SIDE OF PLANE OF DRAWING TO NEAR SIDE
⊗ REPRESENTS FROM NEAR SIDE OF PLANE OF DRAWING TO FAR SIDE

⊙ AND ⊗ REPRESENT DIRECTION OF ELECTRIC CURRENT FLOWING THROUGH COIL
⊙ REPRESENTS FROM FAR SIDE OF PLANE OF DRAWING TO NEAR SIDE
⊗ REPRESENTS FROM NEAR SIDE OF PLANE OF DRAWING TO FAR SIDE

⊙ AND ⊗ REPRESENT DIRECTION OF ELECTRIC CURRENT FLOWING THROUGH COIL
⊙ REPRESENTS FROM FAR SIDE OF PLANE OF DRAWING TO NEAR SIDE
⊗ REPRESENTS FROM NEAR SIDE OF PLANE OF DRAWING TO FAR SIDE

VACUUM PUMP

This application is a U.S. national phase application under 35 U.S.C. § 371 of international application number PCT/JP2022/023381 filed on Jun. 9, 2022, which claims the benefit of JP application number 2021-101957 filed on Jun. 18, 2021. The entire contents of each of international application number PCT/JP2022/023381 and JP application number 2021-101957 are incorporated herein by reference.

TECHNICAL FIELD

The present disclosure relates to a vacuum pump, and more particularly relates to a vacuum pump regarding which adhesion of products can be prevented even when a rotating body is stopped, by heating the rotating body using an alternating current (AC) magnetic field, and also regarding which the rotating body can be heated highly efficiently.

BACKGROUND

Advance in electronics in recent years is leading to rapid increase in demand for semiconductor devices such as memory, integrated circuits, and so forth. These semiconductor devices are fabricated by doping extremely highly pure semiconductor substrates with impurities to impart electrical properties, forming minute circuits on the semiconductor substrates by etching, and so forth.

Such work needs to be performed in a chamber in a high-vacuum state to avoid being affected by dust and the like in air. Vacuum pumps are generally used for evacuating the chamber, and turbomolecular pumps in particular, which are a type of vacuum pump, are widely used from the perspectives of having little residual gas, ease of maintenance, and so forth.

Also, manufacturing processes of semiconductor devices include many processes in which various types of process gasses act upon the semiconductor substrates. Turbomolecular pumps are used not only to draw the inside of the chamber to a vacuum, but also to exhaust such process gasses from the inside of the chamber.

However, there are cases in which process gasses are introduced into the chamber in a high-temperature state, in order to increase reactivity. These process gasses may become cooled when exhausted and become solids at a certain temperature, and precipitation of products in the exhaust system occurs in some cases. There are cases in which such types of process gasses cool and reach a solid state inside the turbomolecular pump, and adhere to and become deposited on the interior of the turbomolecular pump.

When such deposition of precipitates of process gasses on the interior of the turbomolecular pump occurs, the deposited matter can narrow the pump channels and become a cause of lowered performance of the turbomolecular pump. To prevent deposition, heaters are disposed around the base portion of turbomolecular pumps, and heating control of the heaters are performed.

Some examples of pumps not only heat around the base portion and a stator, but also the rotating body side. Some techniques of heating the rotating body for example, disclose a method of causing a direct current (DC) magnetic field generated by a permanent magnet and an electromagnet to intersect the rotating body. Other examples disclose a method of heating the rotating body by lower efficiency of the motor. Further, heating the stator side, and heating the rotating body side by radiant heat therefrom, is also conceivable.

SUMMARY

The present disclosure provides a vacuum pump regarding which adhesion of products can be prevented even when the rotating body is stopped, by heating the rotating body using an AC magnetic field, and also regarding which the rotating body can be heated highly efficiently. That is, the vacuum pump of this disclosure provides prevention of adhesion of the products is preferably continuously performed even when the pump is stopped, not only while the pump is operating.

Accordingly, the present disclosure includes: a rotating body; a motor that rotationally drives the rotating body; a motor electric power source that supplies electric power to the motor for rotational driving; a heating electromagnet that generates an alternating current (AC) magnetic field of a predetermined magnetic field frequency, to heat the rotating body; and a heating electric power source that supplies electric power by AC electric current to the heating electromagnet. The AC magnetic field generated at the heating electromagnet is made to intersect with the rotating body, thereby generating an eddy current at the rotating body, at a perimeter of the AC magnetic field that intersects the rotating body.

The heating electromagnet generates an AC magnetic field of a predetermined magnetic field frequency by the AC electric current supplied from the heating electric power source. The AC magnetic field intersects with the rotating body, thereby generating eddy current in the rotating body at the perimeter of the intersecting AC magnetic field. Eddy current loss is generated by this eddy current, and accordingly the rotating body can be heated. The magnetic field that the heating electromagnet generates is an AC magnetic field, and accordingly the eddy current loss can be generated, and the rotating body can be heated even when rotation of the rotating body is stopped. This can effectively prevent deposited matter from being produced, since deposited matter can be assumed to be generated even when the rotating body is stopped. Also, in the present disclosure, eddy current loss can be made to be generated directly in the rotating body, and accordingly the rotating body can be heated with high efficiency as compared to a case of heating the stator side, and heating the rotating body side by radiant heat thereof.

Also, in the present disclosure, the rotating body includes a heating object that is an object of intersection of the AC magnetic field and that has a predetermined electroconductivity.

According to this technique, including the heating object in the rotating body enables eddy current to be efficiently generated. Accordingly, the rotating body can be heated with high efficiency.

Further, in the present disclosure, when defining a rigid body mode natural angular frequency of the rotating body as $\omega_{res}$, the magnetic field frequency is greater than $\omega_{res}/\sqrt{2}$.

The AC magnetic field heats the rotating body, but also generates suction force on the rotating body at the same time. This suction force becomes a cause of greater vibration of the rotating body. However, by making the magnetic field frequency to be greater than $\omega_{res}/\sqrt{2}$, vibration of the rotating body can be made to be smaller as compared to a case of causing intersection of a direct current (DC) magnetic field of a magnetic flux density of the same size with the rotating body.

Further, in the present disclosure, the magnetic field frequency is greater than a rated rotation frequency defined on the basis of a mechanical angle of the rotating body.

Generally, a great peak of rotation frequency component of a rotating body appears in a spectrum of vibration of a pump generated by rotation of the rotating body. This peak frequency changes in accordance with a state of operation, and a greatest value thereof is a rated rotation frequency defined on the basis of a mechanical angle of the rotating body. Accordingly, in a case in which the frequency of the AC magnetic field generated at the heating electromagnet is greater than the rated rotation frequency defined on the basis of the mechanical angle of the rotating body, the peak of the vibration spectrum of the pump generated by the AC magnetic field does not match the peak of the vibration spectrum generated by rotation of the rotating body. Thus, the vibration of the pump can be made smaller.

Further, in the present disclosure, the magnetic field frequency is greater than a frequency of an electric current flowing through the motor under rated rotations.

Generally, a great peak of frequency component of the electric current flowing through the motor appears in a spectrum of vibration of a pump generated by electric current flowing through the motor. This peak frequency changes in accordance with a state of operation, and a greatest value thereof is a frequency of electric current flowing through the motor under rated rotations. Accordingly, in a case in which the frequency of the AC magnetic field generated at the heating electromagnet is greater than the frequency of the electric current flowing through the motor under rated rotations, the peak of the vibration spectrum of the pump generated by the AC magnetic field does not match the peak of the vibration spectrum generated by the electric current flowing through the motor. Thus, the vibration of the pump can be made smaller.

Also, the present disclosure further includes: a motor inverter that converts output voltage of the motor electric power source, and applies voltage to the motor; and a motor inverter controller that controls the motor inverter. The magnetic field frequency is greater than half of a control frequency of the motor inverter controller.

If the magnetic field frequency is greater than half of the control frequency of the motor inverter controller, heating can be performed with an AC magnetic field of a frequency that is greater in comparison with a case of heating the rotating body by the motor inverter applying AC electric current superimposed on the electric current flowing through the motor, and generating an AC magnetic field for heating superimposed on the magnetic field of the motor. Accordingly, the magnetic flux density of the AC magnetic field for obtaining the same eddy current loss at the rotating body can be made smaller, whereby the external force generated at the rotating body by the AC magnetic field can be made smaller, and vibration of the rotating body can be made smaller.

Also, the present disclosure further includes: a magnetic bearing that supports the rotating body in air by levitation; a magnetic bearing electric power source that supplies electric power to the magnetic bearing; a magnetic bearing inverter that converts output voltage of the magnetic bearing electric power source, and that applies voltage to the magnetic bearing; and a magnetic bearing inverter controller that controls the magnetic bearing inverter. The magnetic field frequency is greater than half of a control frequency of the magnetic bearing inverter controller.

If the magnetic field frequency is greater than half of the control frequency of the magnetic bearing inverter controller, heating can be performed with an AC magnetic field of a frequency that is greater in comparison with a case of heating the rotating body by the magnetic bearing inverter applying AC electric current superimposed on the electric current flowing through the magnetic bearing, and generating an AC magnetic field for heating superimposed on the magnetic field of the magnetic bearing. Accordingly, the magnetic flux density of the AC magnetic field for obtaining the same eddy current loss at the rotating body can be made smaller, the external force generated at the rotating body by the AC magnetic field can be made smaller, and vibration of the rotating body can be made smaller.

Also, the present disclosure further includes: a magnetic bearing that supports the rotating body in air by levitation; a magnetic bearing electric power source that supplies electric power to the magnetic bearing; a displacement sensor that measures a position of the rotating body by non-contact on the basis of a position signal modulated by a predetermined sensor frequency; and a demodulation circuit that includes a low-pass filter for demodulating the position signal. The magnetic field frequency is greater than a cutoff frequency of the low-pass filter.

If the magnetic field frequency is greater than the cutoff frequency of the low-pass filter that demodulates the position signal from the displacement sensor, the vibration component of the pump generated by the AC magnetic field, included in the demodulated position signal from the displacement sensor, becomes small. Accordingly, vibration of the pump generated by the AC magnetic field does not affect position control of the rotating body, and magnetic bearing control that is more stable can be realized.

Also, the present disclosure further includes: a magnetic bearing that supports the rotating body in air by levitation; a magnetic bearing electric power source that supplies electric power to the magnetic bearing; and a displacement sensor that measures a position of the rotating body by non-contact on the basis of a position signal modulated by a predetermined sensor frequency. The magnetic field frequency is greater than the sensor frequency.

If the magnetic field frequency is greater than the sensor frequency, the vibration component of the pump generated by the AC magnetic field, included in the position signal from the displacement sensor, becomes small. Accordingly, vibration of the pump generated by the AC magnetic field does not affect position control of the rotating body, and magnetic bearing control that is more stable can be realized.

Further, in the present disclosure, the heating electric power source also serves as the motor electric power source.

AC electric current is supplied to the heating electromagnet from the motor electric power source. Accordingly, a space-conserving and inexpensive configuration can be realized.

Also, the present disclosure further includes: a magnetic bearing that supports the rotating body in air by levitation; and a magnetic bearing electric power source that supplies electric power to the magnetic bearing. The heating electric power source also serves as the magnetic bearing electric power source.

AC electric current is supplied to the heating electromagnet from the magnetic bearing electric power source. Accordingly, a space-conserving and inexpensive configuration can be realized.

Further, in the present disclosure, the heating electric power source also serves as the magnetic bearing electric power source.

AC electric current is supplied to the heating electromagnet from the magnetic bearing electric power source. Accordingly, a space-conserving and inexpensive configuration can be realized.

As described above, according to the present disclosure, the heating electromagnet that generates an AC magnetic field of a predetermined magnetic field frequency, to heat the rotating body, is included, and the AC magnetic field generated at the heating electromagnet is made to intersect with the rotating body, whereby the AC magnetic field generates an eddy current at the rotating body, at the perimeter of the AC magnetic field that intersects. Eddy current loss is generated by this eddy current, and accordingly the rotating body can be heated. The magnetic field that the heating electromagnet generates is an AC magnetic field, and accordingly the eddy current loss can be generated even when rotation of the rotating body is stopped. Deposited matter is assumed to be produced even when the pump is stopped, and accordingly this can effectively prevent deposited matter from being produced. Also, eddy current loss can be made to be generated directly in the rotating body, and accordingly the rotating body can be heated with high efficiency.

In this manner, the vacuum pump of this disclosure may provide advantages over other examples of vacuum pumps, such as configuration that heats with a direct current (DC) magnetic field, which does not need to be provided with a heating electric power source that is capable of supplying AC electric current, since the magnetic field intersecting the rotating body is DC, but at the same time, the rotating body can be heated only while the rotating body is rotating, and the rotating body cannot be heated when the rotating body is stopped. Also, heating control for when preventing adhesion of products may benefit from further efficiency of electric power consumption for heating.

DETAILED DESCRIPTION

Figure 1:
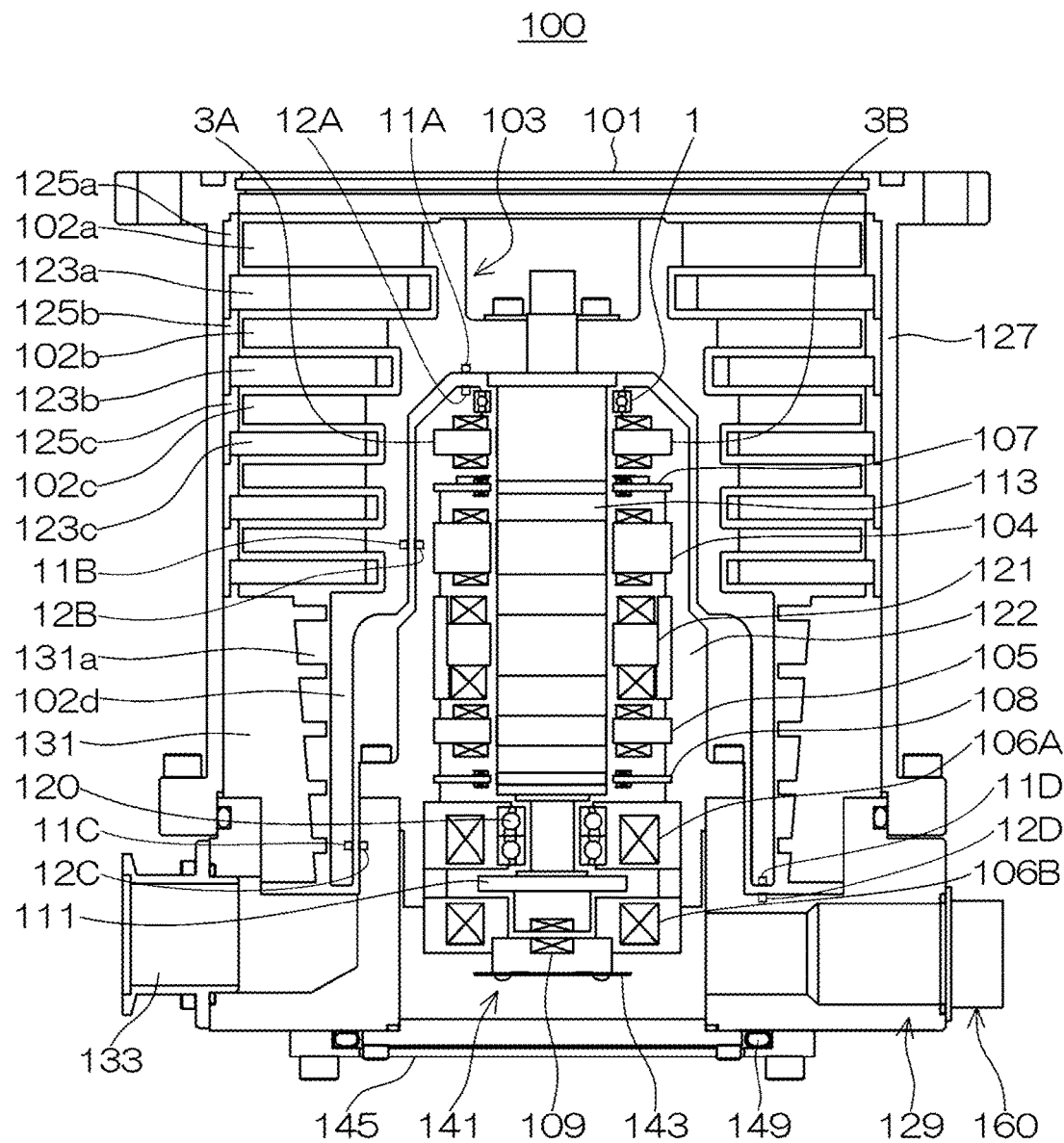
FIG. 1 is a configuration diagram of a turbomolecular pump used in an example of the present disclosure.

An example of the present disclosure will be described below. FIG. 1 is a configuration diagram of a turbomolecular pump used in the example of the present disclosure. In FIG. 1, an inlet port 101 is formed at an upper end of an outer cylinder 127, which is cylindrically shaped, in the turbomolecular pump 100. On an inner side of the outer cylinder 127, a rotating body 103 is provided. Provided extending radially on a peripheral portion of the rotating body 103 is a plurality of rotor blades 102 (102a, 102b, 102c . . . ) serving as turbine blades for suction and exhaust of gas, the rotor blades 102 are provided in a plurality of stages. A rotor shaft 113 is attached to a center of the rotating body 103, and the rotor shaft 113 is made to be supported by levitation in air and to be position-controlled by a five-axis control magnetic bearing, for example. The rotating body 103 is generally made of a metal such as aluminum, aluminum alloy, or the like.

Upper-side radial-direction electromagnets 104 are four electromagnets, disposed in pairs on an X axis and a Y axis. Four upper-side radial-direction sensors 107 are provided in close proximity to the upper-side radial-direction electromagnets 104 and corresponding to each of the upper-side radial-direction electromagnets 104. Inductance sensors, eddy current sensors, or the like, having conducting windings, are used as the upper-side radial-direction sensors 107, for example. A position of the rotor shaft 113 is detected on the basis of change in inductance of the conducting windings that changes in accordance with the position of the rotor shaft 113. These upper-side radial-direction sensors 107 are configured to detect radial-direction displacement of the rotor shaft 113, i.e., of the rotating body 103 fixed thereto, and to send information thereof to an unshown central processing unit (CPU) inside a control device 200 illustrated in FIG. 2.

Functions of a magnetic bearing controller are implemented in this CPU. A compensating circuit having proportional-integral-differential (PID) adjusting functions, for example, generates excitation control command signals for the upper-side radial-direction electromagnets 104 on the basis of position signals detected by the upper-side radial-direction sensors 107, and a magnetic bearing inverter 16 illustrated in FIG. 2 performs excitation control of the upper-side radial-direction electromagnets 104 on the basis of these excitation control command signals, thereby adjusting a radial-direction position of an upper side of the rotor shaft 113.

This rotor shaft 113 is formed of a material having high magnetic permeability (iron, stainless steel, etc.) or the like, and is arranged to be suctioned by magnetic force of the upper-side radial-direction electromagnets 104. This adjustment is performed independently for an X-axial direction and a Y-axial direction. Lower-side radial-direction electromagnets 105 and lower-side radial-direction sensors 108 are also disposed in the same way as the upper-side radial-direction electromagnets 104 and the upper-side radial-direction sensors 107, and adjust the radial-direction position of a lower side of the rotor shaft 113 in the same way as with the radial-direction position of the upper side.

Further, axial-direction electromagnets 106A and 106B are disposed across a metal disc 111 that is disc-shaped and is provided at a lower portion of the rotor shaft 113, above and below. The metal disc 111 is made of a high magnetic permeability material such as iron or the like. An axial-direction sensor 109 is provided in order to detect displacement of the rotor shaft 113 in the axial direction, and is configured to send axial-direction position signals thereof to the CPU in the control device 200.

In the magnetic bearing controller implemented in the CPU, the compensating circuit having PID controller functions, for example, generates excitation control command signals for each of the axial-direction electromagnet 106A and the axial-direction electromagnet 106B on the basis of axial-direction position signals detected by the axial-direction sensor 109, and the magnetic bearing inverter 16 performs excitation control of each of the axial-direction electromagnet 106A and the axial-direction electromagnet 106B on the basis of these excitation control command signals, whereby the axial-direction electromagnet 106A suctions the metal disc 111 upward by magnetic force and the axial-direction electromagnet 106B suctions the metal disc 111 downward, thereby adjusting the axial-direction position of the rotor shaft 113.

Thus, the control device 200 adjusts the magnetic force that the axial-direction electromagnets 106A and 106B apply to the metal disc 111 as appropriate, causing magnetic levitation of the rotor shaft 113 in the axial direction, so as to be held in air without contact.

Also, a motor 121 is provided with a plurality of magnetic poles disposed perimetrically surrounding the rotor shaft 113. Each magnetic pole is controlled by the control device 200 so as to rotationally drive the rotor shaft 113 through electromagnetic force acting between itself and the rotor shaft 113. An unshown rotational velocity sensor, such a Hall device, a resolver, an encoder, or the like, for example, is assembled into the motor 121, and rotational velocity of the rotor shaft 113 is detected by detection signals from this rotational velocity sensor.

Further, an unshown phase sensor is attached in a proximity of the lower-side radial-direction sensors 108 for example, and is arranged to detect a phase of rotation of the rotor shaft 113. The control device 200 uses both of detection signals of this phase sensor and the rotational velocity sensor to detect the position of the magnetic poles. A plurality of stator blades 123 (123a, 123b, 123c . . . ) is disposed with a slight spacing as to the rotor blades 102 (102a, 102b, 102c . . . ). The rotor blades 102 (102a, 102b, 102c . . . ) are each formed inclined at a predetermined angle from a plane perpendicular to an axial line of the rotor shaft 113, in order to transport molecules of exhaust gas downward through collision therewith. The stator blades 123 (123a, 123b, 123c . . . ) are made of a metal such as, for example, aluminum, iron, stainless steel, copper, or the like, or a metal such as an alloy containing any of these metals as a component.

The stator blades 123 are also formed inclined at a predetermined angle from the plane perpendicular to the axial line of the rotor shaft 113 in the same way, and are disposed extending toward the inner side of the outer cylinder 127, alternating with the stages of rotor blades 102. Outer circumferential ends of the stator blades 123 are supported in a state of being inserted between a plurality of stator blade spacers 125 (125a, 125b, 125c . . . ) that are stacked up. The stator blade spacers 125 are ring-shaped members, and are made of a metal such as, for example, aluminum, iron, stainless steel, copper, or the like, or a metal such as an alloy containing any of these metals as a component. The outer cylinder 127 is fixed on outer perimeters of the stator blade spacers 125, with a slight gap therebetween. A base portion 129 is disposed at a bottom portion of the outer cylinder 127. An outlet port 133 is formed in the base portion 129 so as to externally communicate. Exhaust gas that enters the inlet port 101 from a chamber (a vacuum chamber) side and is transported to the base portion 129 is sent to the outlet port 133.

Further, depending on the use of the turbomolecular pump 100, a threaded spacer 131 is disposed between a bottom portion of the stator blade spacers 125 and the base portion 129. The threaded spacer 131 is a cylindrically shaped member made of aluminum, copper, stainless steel, or iron, or a metal such as an alloy containing any of these metals as a component, or the like, with a plurality of thread grooves 131a that is spiral-like and that is ditched in an inner circumferential face thereof. A direction of spiraling of the thread grooves 131a is a direction in which molecules of exhaust gas are transported toward the outlet port 133, when the molecules move in a rotational direction of the rotating body 103. A cylindrical portion 102d that extends downward continuing from the rotor blades 102 (102a, 102b, 102c . . . ) is provided at a bottommost portion of the rotating body 103. An outer circumferential face of this cylindrical portion 102d is cylindrically shaped and is enlarged toward the inner circumferential face of the threaded spacer 131, and is in close proximity with the inner circumferential face of the threaded spacer 131 across a predetermined gap. Exhaust gas transported to the thread grooves 131a by the rotor blades 102 and the stator blades 123 is sent to the base portion 129, being guided by the thread grooves 131a.

The base portion 129 is a disc-shaped member making up a base portion of the turbomolecular pump 100, and generally is made of a metal such as iron, aluminum, stainless steel, or the like. The base portion 129 serves to physically hold the turbomolecular pump 100, and also has functions of a thermal conduction path. Accordingly, a metal that has rigidity, and also has high thermal conductivity, such as iron, aluminum, copper, or the like, is preferably used for the base portion 129.

In this configuration, upon the rotor blades 102 being rotationally driven by the motor 121 along with the rotor shaft 113, exhaust gas is sucked through the inlet port 101 from the unshown chamber, by operations of the rotor blades 102 and the stator blades 123. The rotational velocity of the rotor blades 102 normally is 20,000 rpm to 90,000 rpm, and peripheral velocity at tip ends of the rotor blades 102 reaches 200 m/s to 400 m/s. Exhaust gas sucked through the inlet port 101 passes between the rotor blades 102 and the stator blades 123, and is transported to the base portion 129.

Note that description has been made above that the threaded spacer 131 is disposed on an outer perimeter of the cylindrical portion 102d of the rotating body 103, with the thread grooves 131a ditched in the inner circumferential face of the threaded spacer 131. However, there are reverse cases in which thread grooves are ditched in the outer circumferential face of the cylindrical portion 102d, and a spacer having a cylindrically shaped inner circumferential face is disposed therearound.

Also, depending on the use of the turbomolecular pump 100, there are cases in which a perimeter of an electrical component portion configured of the upper-side radial-direction electromagnets 104, the upper-side radial-direction sensors 107, the motor 121, the lower-side radial-direction electromagnets 105, the lower-side radial-direction sensors 108, the axial-direction electromagnets 106A and 106B, the axial-direction sensor 109, and so forth, is covered by a stator column 122, so that gas suctioned through the inlet port 101 does not intrude into the electrical component portion, and inside of this stator column 122 is maintained at a predetermined pressure by a purge gas.

In this case, unshown piping is disposed in the base portion 129, and the purge gas is introduced through this piping. The introduced purge gas is sent out to the outlet port 133 through gaps between a protective bearing 120 and the rotor shaft 113, between a rotor and a stator of the motor 121, and between the stator column 122 and inner-circumferential-side cylindrical portions of the rotor blades 102.

Now, the turbomolecular pump 100 uses control based on identification of model, and individually-adjusted unique parameters (e.g., various characteristics corresponding to the model). The turbomolecular pump 100 is provided with an electronic circuit portion 141 within a main unit thereof, in order to store these control parameters. The electronic circuit portion 141 is configured of electronic parts such as semiconductor memory like electrically erasable programmable read-only memory (EEPROM), semiconductor devices for access thereto and so forth, a substrate 143 on which these are mounted, and so forth. The electronic circuit portion 141 is accommodated below an unshown rotational velocity sensor near a middle, for example, of the base portion 129 that makes up a lower portion of the turbomolecular pump 100, and is closed off by a bottom cover 145 that is airtight.

Now, there are some process gasses introduced into the chamber during manufacturing processes of semiconductor devices that have a nature of solidifying when a pressure thereof becomes higher than a predetermined value or a temperature thereof becoming lower than a predetermined value. Inside of the turbomolecular pump 100, the pressure of exhaust gas is lowest at the inlet port 101 and highest at the outlet port 133. When the pressure of the process gas becomes higher than the predetermined value, or the temperature thereof becoming lower than the predetermined value, while being transported from the inlet port 101 to the outlet port 133, the process gas solidifies, and adheres to the inside of the turbomolecular pump 100 and thus is deposited.

For example, in a case of using tetrachlorosilane (SiCl$_4$) as a process gas in an aluminum etching device, it can be understood from a vapor gas curve that precipitation of a solid product (e.g., aluminum chloride (AlCl$_3$)) will occur under low vacuum (760 torr to 10$^{-2}$ torr) and low temperature (approximately 20° C.), and become adhered to and deposited on the inside of the turbomolecular pump 100. Accordingly, when deposition of a precipitate of a process gas on the inside of the turbomolecular pump 100 occurs, the deposited matter narrows pump channels, causing deterioration in performance of the turbomolecular pump 100. The aforementioned product tends to solidify and adhere at portions where pressure is high, such as around the outlet port 133 and around the threaded spacer 131.

In some other examples, an arrangement is conventionally made in which an unshown heater, and a coolant pipe 149 that is annular in shape, are wound onto an outer perimeter of the base portion 129 or the like, and also an unshown temperature sensor (e.g., a thermistor) is embedded in the base portion 129, for example. Control of heating by the heater and cooling by the coolant pipe 149 so as to maintain the temperature of the base portion 129 at a constant high temperature (set temperature) on the basis of signals from this temperature sensor is performed (hereinafter referred to as "temperature management system" (TMS)).

Figure 2:
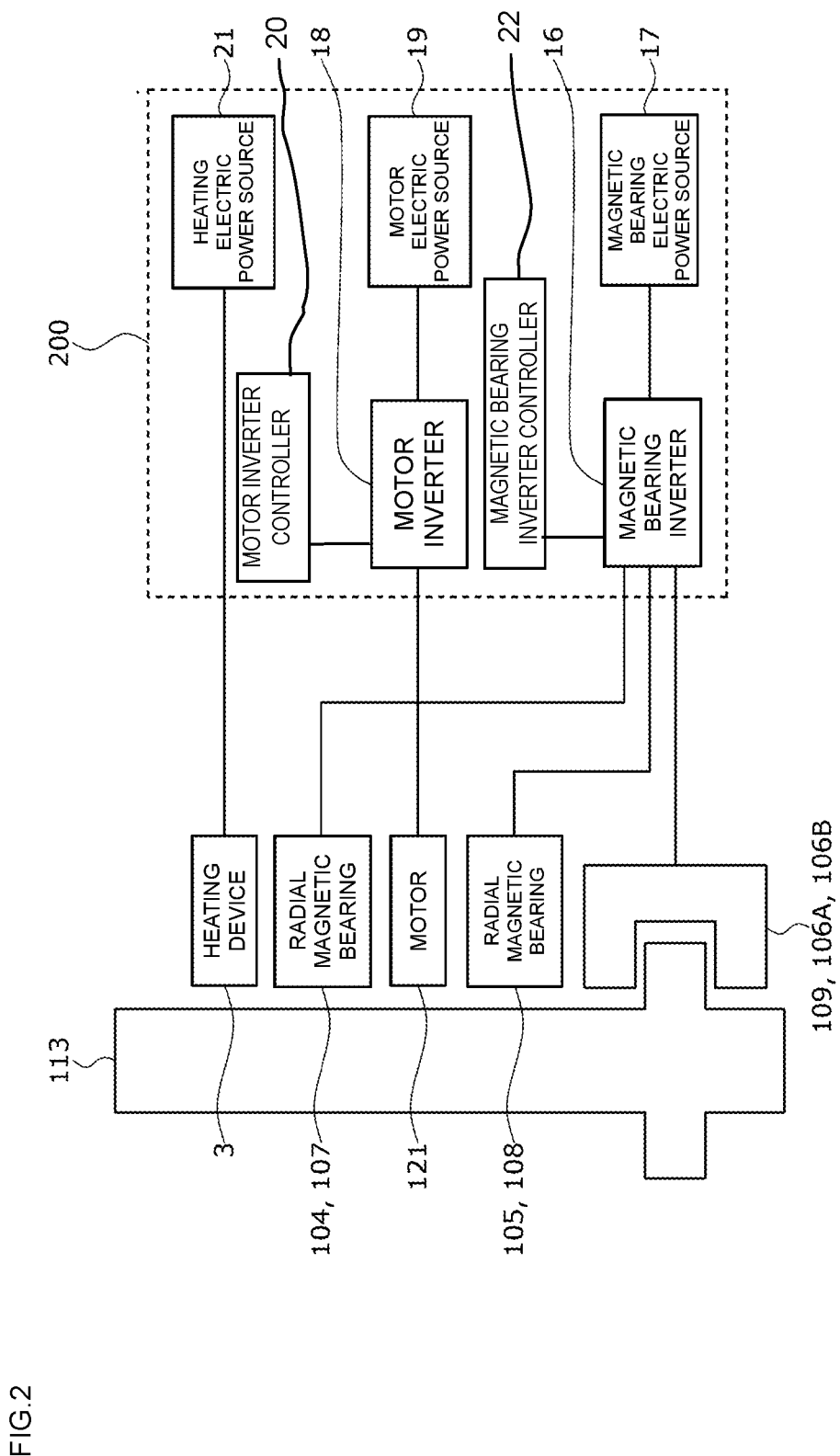
FIG. 2 is a configuration diagram of power source related devices regarding a control device.

Next, heating control of the rotating body 103 will be described. Heating of the base portion 129 side is conventionally performed, as described above, but further heating including the rotating body 103 side is desired in recent years, in order to improve operation efficiency of the pump by preventing deposition of products. A method of performing such heating control of the rotating body 103 will be described with reference to FIGS. 1 and 2. In FIG. 1, two poles, of a heating electromagnet 3A and a heating electromagnet 3B, are disposed facing each other across the rotor shaft 113, between a protective bearing 1 and the upper-side radial-direction sensors 107. The heating electromagnet 3A and the heating electromagnet 3B are equivalent to a heating device 3, and the heating device 3 receives supply of alternating current (AC) electric current from a heating electric power source 21, as illustrated in FIG. 2. Excitation of the heating electromagnet 3A and the heating electromagnet 3B occurs due to this AC electric current, generating an AC magnetic field.

In this configuration, the generated AC magnetic field intersects with the rotor shaft 113. Eddy current is generated around the intersecting AC magnetic field. An arrangement may be made herein, in which an unshown heating object, which has electroconductivity, may be fixed to the rotor shaft 113, so that the AC magnetic field passes through this heating object, thereby generating the eddy current. Examples of material of the heating object include electroconductive metals such as iron, stainless steel, aluminum, and so forth, but ferromagnetic substances such as iron, stainless steel, and so forth, are more preferable. The rotating body 103 is heated by this eddy current.

The AC magnetic field may be a sine wave, or may be another waveform such as a square wave, triangular wave, or the like, or may be a combination thereof. Also, a direct current (DC) magnetic field may be offset as to this AC magnetic field. In a case of using non-sine waveforms, the basic component of each waveform is deemed to be the frequency of the magnetic field.

According to page 59 ((2) Eddy Current Loss) of "Magnetic Bearing Guidebook for Rotating Machine Designers", by Japan Industrial Publishing Co., Ltd., with regard to eddy current loss generated at this time, the eddy current loss $P_e$ can be expressed by Expression 1

$$P_e = \frac{\pi^2 t^2 f^2 V B_m^2}{6\rho} \quad \text{Expression 1}$$

where t represents plate thickness, f represents fluctuation frequency of magnetic field, V represents volume of magnetic substance to be subjected to fluctuation of magnetic field, $B_m$ represents greatest magnetic flux density, and $\rho$ represents specific resistance of the magnetic substance. According to Expression 1, the eddy current loss $P_e$ can be understood to increase proportionate to the frequency of the AC magnetic field squared. Accordingly, heating accompanying the eddy current loss $P_e$ can be efficiently generated in a non-contact manner, by using an AC magnetic field. It can also be understood that the magnetic flux density $B_m$ of the magnetic field to obtain the same eddy current loss $P_e$ decreases in inverse proportion to the fluctuation frequency f of the magnetic field.

Also, in a case of causing the AC magnetic field to intersect the rotating body 103, the eddy current loss $P_e$ can be generated even when rotation of the rotor shaft 113 is stopped. Deposited matter is assumed to be generated even when the pump is stopped, and accordingly this can effectively prevent deposited matter from being produced.

Next, vibration of the rotating body 103 and the pump will be studied. Vibration of the rotating body 103 is a cause of malfunctioning of the rotating body 103. In particular, in a pump in which the rotating body 103 is levitated using magnetic bearings, increase in vibration of the rotating body 103 renders magnetic bearing control impossible, and there is a possibility of touchdown occurring, in which the rotor shaft 113 comes into contact with the protective bearings 1 and 120. Vibration of the rotating body 103 is also conveyed to the entire pump through the bearings, motor 121, and so forth.

Further, the upper-side radial-direction electromagnets 104, the lower-side radial-direction electromagnets 105, the axial-direction electromagnets 106A and 106B, electromagnets of the motor 121, the heating electromagnets 3A and 3B of the heating device 3, and so forth, which make up the magnetic bearing, are present in a stator portion of the pump. Electric current flows to the coils in these electromagnets and magnetic fields are generated, causing deformation of a core due to mutual interaction between the magnetic fields and the core, and vibration occurs. This vibration is conveyed to the entire pump.

As a result of these vibrations, there is a possibility of noise occurring, and adverse effects on the manufacturing processes of semiconductor devices occurring, due to vibrations being conveyed to the unshown chamber side via the inlet port 101. Accordingly, maximal suppression of vibrations of the rotating body and the pump is desirable.

Figure 3:
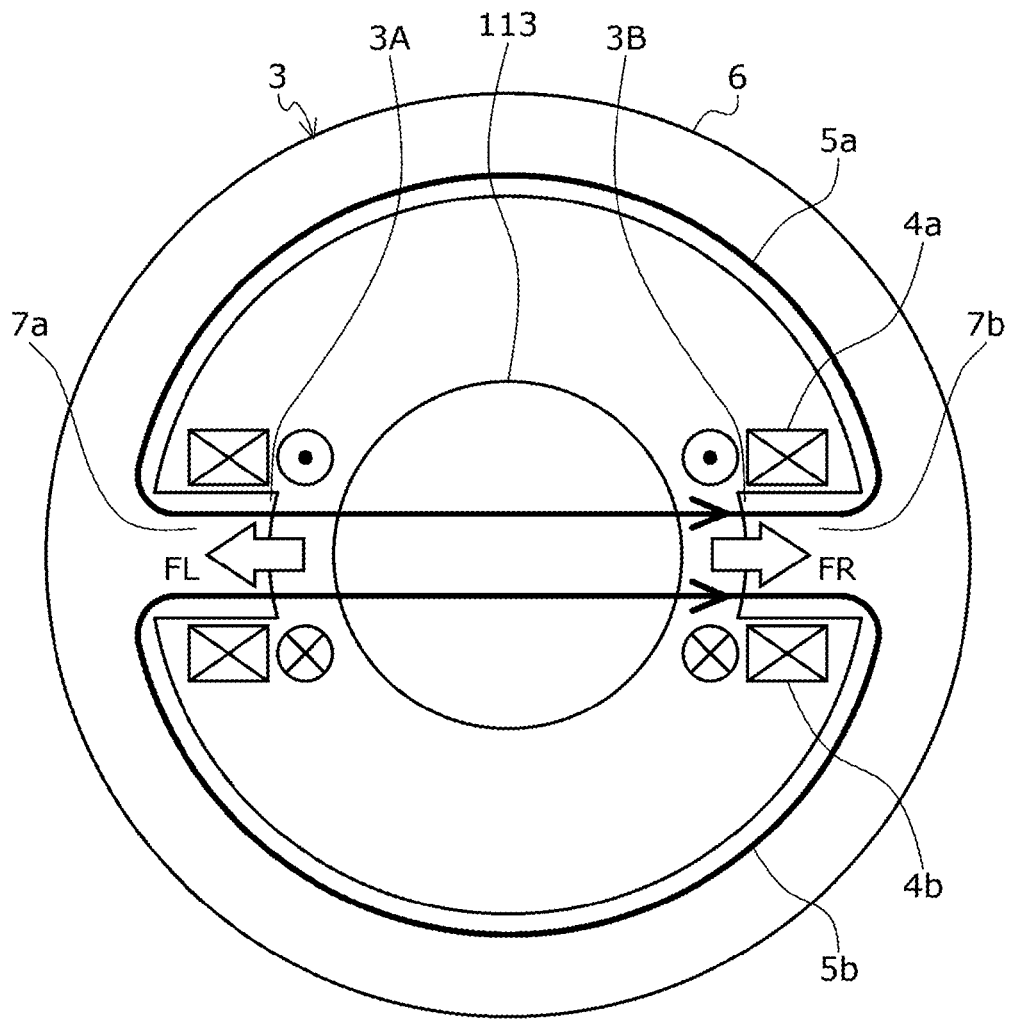
FIG. 3 is a diagram illustrating a way in which external force is generated by an alternating current (AC) magnetic field.

Vibration of the rotating body 103 accompanying causing the AC magnetic field to intersect the rotor shaft 113 will be studied. Causing intersection of the AC magnetic field with the rotor shaft 113 in order to generate the eddy current loss $P_e$ generates external force due to this AC magnetic field. FIG. 3 illustrates the way in which external force is generated by the AC magnetic field. FIG. 3 illustrates magnetic fields and external force in the two-pole layout illustrated in FIGS. 1 and 2. In a case of an isotropic pole layout, right and left external forces $F_R$ and $F_L$ ideally should balance. However, in practice, external force on the rotor shaft 113 is generated due to factors such as variance in shapes due to processing precision, eccentricity of the rotor shaft 113 due to imbalancing, variance in magnetic properties of materials, and so forth. There also is a possibility of external force on the rotor shaft 113 being generated in a case of an anisotropic pole layout as well. Accordingly, the external forces $F_R$ and $F_L$ on the rotor shaft 113 are preferably made small, in order to achieve stable rotation of the rotating body 103 with low vibration.

The external force $F_R$ generated accompanying the AC magnetic field intersecting the rotor shaft 113 is proportionate to the square of magnetic flux density $B_g$ at the gap between the heating electromagnet 3B and the rotor shaft 113, as shown in Expression 2.

$$F_R \propto B_g^2 \qquad \text{Expression 2}$$

Now, the external force $F_R$ in Expression 2 is defined as shown in Expression 3, using a proportionality constant $K_g$.

$$F_R = K_g B_g^2 \qquad \text{Expression 3}$$

Assuming the magnetic flux density $B_g$ at the gap at time t to be a sine wave of amplitude $B_{g1}$ and angular frequency $\omega_0$ in Expression 4, $$B_g = B_{g1} \cos \omega_0 t \qquad \text{Expression 4}$$

the external force $F_R$ applied to the rotor shaft 113 is as shown in Expression 5.

$$F_R = K_g B_{g1}^2 \cos^2 \omega_0 t = K_g B_{g1}^2 \cdot \frac{1}{2}(1 + \cos 2 \omega_0 t) \qquad \text{Expression 5}$$

Figure 4:
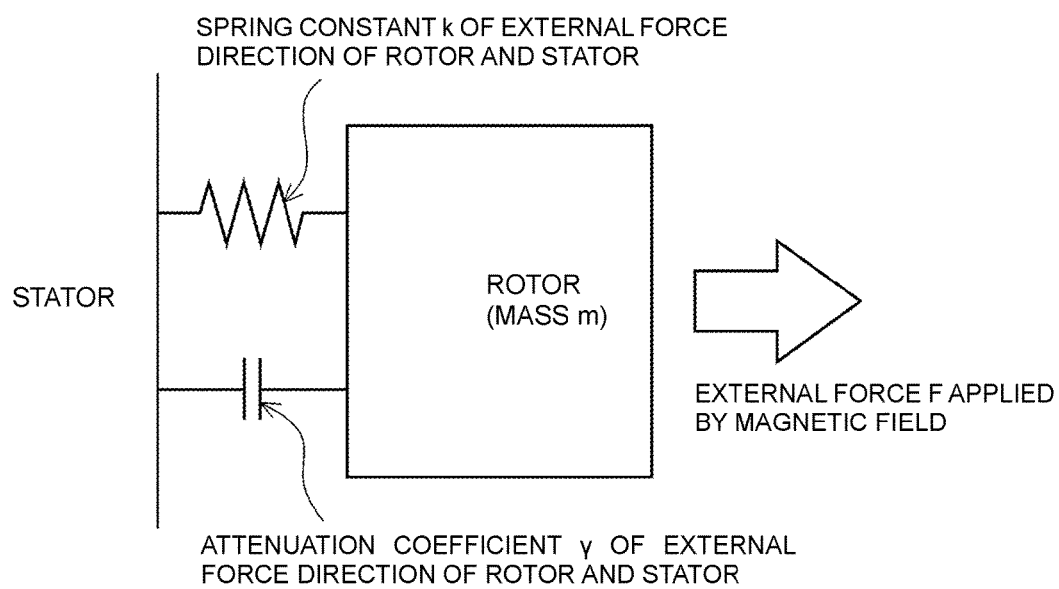
FIG. 4 is a configuration diagram of a forced vibration model.

Now, since Expression 6 holds, $$0 \leq \cos^2 \omega_0 t \leq 1 \qquad \text{Expression 6}$$

if $B_{g1}$ can be made to be 1/n times, the greatest value of the external force $F_R$ will be $1/n^2$ times. The effects of this external force $F_R$ will be studied with regard to a forced vibration model in FIG. 4. Here, k represents a spring constant in an external force direction of the rotating body and stator, γ represents an attenuation coefficient in the external force direction of the rotating body and stator, m represents mass of the rotating body, and F represents the external force applied by the magnetic field.

At this time, when $$\omega_k^2 = \frac{k}{m} \qquad \text{Expression 7}$$

is defined, a rigid body mode natural angular frequency $\omega_{res}$ of a rotating body in a direction in which external force is applied is as shown in Expression 9 when the attenuation coefficient γ is as shown in Expression 8.

$$\gamma < \frac{\omega_k}{\sqrt{2}} \qquad \text{Expression 8}$$

$$\omega_{res} = \sqrt{\omega_k^2 - 2\gamma^2} \qquad \text{Expression 9}$$

Contrastingly, when the attenuation coefficient γ is as shown in Expression 10, $\omega_{res}$ is defined as shown in Expression 11.

$$\gamma \geq \frac{\omega_k}{\sqrt{2}} \qquad \text{Expression 10}$$

$$\omega_{res} = 0 \qquad \text{Expression 11}$$

Figure 5:
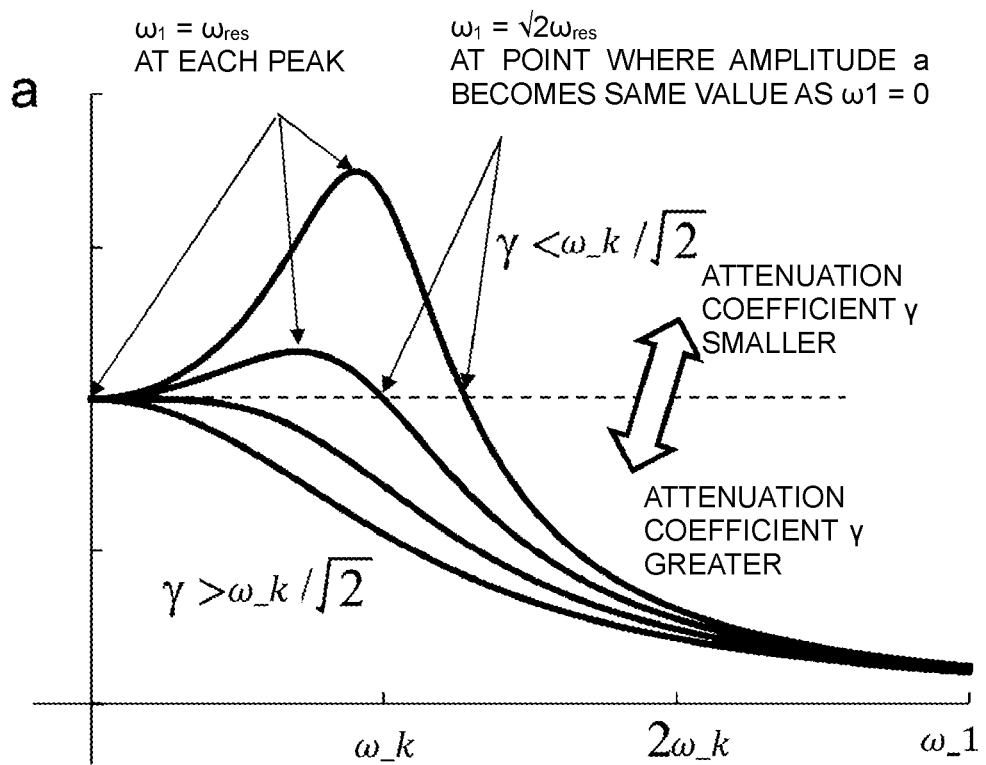
FIG. 5 is a diagram showing a relation between amplitude and frequency.

At this time, if the AC satisfies Expression 12, the displacement (forced vibration response) of the rotor shaft 113 as to the same magnetic flux density becomes smaller as compared to a case of DC in Expression 13. The higher the frequency of the AC magnetic field is, the smaller this displacement becomes. The way in which this transpires is shown in FIG. 5.

$$\omega_0 \geq \frac{1}{\sqrt{2}} \omega_{res} \quad \text{Expression 12}$$

$$\omega_0 = 0 \quad \text{Expression 13}$$

Next, proof regarding this forced vibration model will be given. An equation of motion of the forced vibration model is that in Expression 14, and F/m is assumed to be a sine wave based on forced vibration in Expression 15. Here, x represents displacement of the rotor shaft, and ω1 is angular frequency of external force F.

$$\frac{d^2}{dt^2}x + 2\gamma \frac{d}{dt}x + \omega_k^2 x = \frac{F}{m} \quad \text{Expression 14}$$

$$\frac{F}{m} = f_0 \cos \omega_1 t \quad \text{Expression 15}$$

With the solution of x as shown in Expression 16, a is as shown in Expression 17.

$$a \cos(\omega_1 t - \delta) \quad \text{Expression 16}$$

$$a = \frac{f_0}{\sqrt{(\omega_k^2 - \omega_1^2)^2 + (2\gamma\omega_1)^2}} \quad \text{Expression 17}$$

In a case of a DC magnetic field intersecting the rotor shaft, i.e., in a case in which $\omega_0=0$, the external force F is as shown in Expression 18, and accordingly $\omega_1=0$ and a is as shown in Expression 19.

$$F = K_g B_{g1}^2 \quad \text{Expression 18}$$

$$a = \frac{f_0}{\omega_k} = \frac{F}{k} = \frac{k_g}{k} B_{g1}^2 \quad \text{Expression 19}$$

Contrastingly, in a case of an AC magnetic field intersecting the rotor shaft, the external force F is as shown in Expression 20, and is represented as a sum of DC component and AC component.

$$F = k_g B_{g1}^2 \cdot \frac{1}{2}(1 + \cos 2 \omega_0 t) \quad \text{Expression 20}$$

Amplitude a of the rotor shaft 113 as to the DC component of the force is as shown in Expression 21.

$$\frac{1}{2} \frac{k_g}{k} B_{g1}^2 \quad \text{Expression 21}$$

Accordingly, if the amplitude of the AC component of the angular frequency $\omega_1$ in the external force is smaller than Expression 22, the amplitude of displacement of the rotor shaft 113 in forced vibration due to the AC magnetic field is small as compared to a case in which a DC magnetic field is applied that is the same as the greatest magnetic flux density of the AC magnetic field.

$$\frac{1}{2} \frac{k_g}{k} B_{g1}^2 \quad \text{Expression 22}$$

A $\omega_1$ that yields Expression 23 is as shown in Expression 24. Also, there is a relation shown in Expression 25 between $\omega_0$ and $\omega_1$.

$$\frac{f_0}{\sqrt{(\omega_k^2 - \omega_1^2)^2 + (2\gamma\omega_1)^2}} = \frac{1}{2} \frac{k_g}{k} B_{g1}^2 \quad \text{Expression 23}$$

$$\omega_1 = \sqrt{2} \omega_{res} \quad \text{Expression 24}$$

$$\omega_1 = 2\omega_0 \quad \text{Expression 25}$$

Accordingly, at a frequency of the AC magnetic field satisfying Expression 26, the amplitude of displacement of the rotor shaft 113 in forced vibration due to the AC magnetic field is small as compared to a case in which a DC magnetic field is applied that is the same as the greatest magnetic flux density of the AC magnetic field.

$$\omega_0 \geq \frac{1}{\sqrt{2}} \omega_{res} \quad \text{Expression 26}$$

Next, vibration occurring in the pump due to AC magnetic fields being generated at the heating electromagnets 3A and 3B of the heating device will be studied. In FIG. 3, the heating electromagnets 3A and 3B are made up of a core 6 primarily made of laminated steel sheets or ferrite, coils 4a and 4b wound on protruding pole portions 7a and 7b of the core 6, and so forth. Magnetomotive force is generated by AC electric current supplied by the heating electric power source flowing through the coils 4a and 4b, and AC magnetic fields of the same frequency as that of the AC electric current are generated in the core 6. The generated AC magnetic fields intersect the rotor shaft 113 across the gap, thereby forming closed loops 5a and 5b of magnetic force lines.

When generating the AC magnetic fields, deformation of the core 6 due to mutual interaction between the AC magnetic fields and the core 6 occurs, and vibration of the frequency component of the AC magnetic field is generated at the heating electromagnets 3A and 3B. This vibration of the heating electromagnets 3A and 3B is conveyed to the entire pump through portions joining the heating electromagnets 3A and 3B and the pump, and so forth.

Next, vibration of the rotating body 103 generated by rotation of the rotating body 103 will be studied. When the rotating body 103 rotates, external force on the rotating body 103 is generated due to factors such as variance in shapes due to processing precision, eccentricity of the rotating body 103 due to imbalancing, variance in magnetic properties of materials, and so forth, and vibration occurs. A great peak of rotation frequency component of the rotating body 103 appears in a spectrum of this vibration. This peak frequency changes in accordance with a state of operation, and a greatest value thereof is a rated rotation frequency defined on the basis of a mechanical angle of the rotating body 103.

Accordingly, in a case in which the frequency of the AC magnetic field generated at the heating electromagnets 3A and 3B is greater than the rated rotation frequency defined on the basis of the mechanical angle of the rotating body 103, the peak of the vibration spectrum of the pump generated by the AC magnetic field does not match the peak of the vibration spectrum generated by rotation of the rotating body 103. Accordingly, the peak of the vibration spectrum of the pump can be made smaller.

Next, vibration of the pump generated by electric current flowing through the motor 121 will be studied. The motor 121 is made up of a stator that is made of an electromagnet in which coils are wound on a core and that is fixed to the pump, and a rotor that conveys torque generated by mutual interaction with magnetic fields generated from the stator to a rotating body. Note that in a case in which the motor 121 is a permanent-magnet synchronous motor, for example, a frequency of electric current under rated rotations is equal to an electrical angular frequency, and this electrical angular frequency can be calculated by mechanical angular frequency×number of pairs of poles.

In the stator of the motor 121, deformation of the core due to mutual interaction between the magnetic fields and the core occurs, and vibration of the frequency component of the electric current flowing through the motor is generated. This vibration is conveyed to the entire pump through portions joining the motor and the pump.

Figure 6:
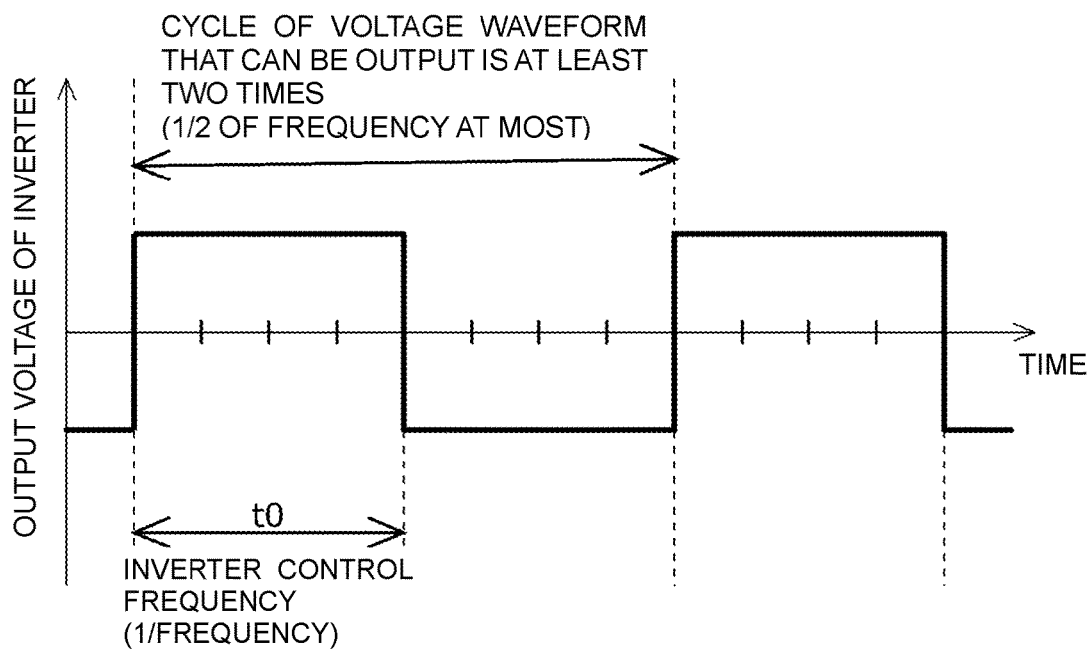
FIG. 6 is a timing chart of pulse-width modulation (PWM) control.

With regard to rotational driving of the motor 121, pulse-width modulation (PWM) control using a motor inverter 18 is performed. As shown in FIG. 6, control is performed in cycles to in this PWM control. Control frequency $f_0=1/t_0$ at this time is equivalent to control frequency of a motor inverter controller 20. Frequency f of voltage that the motor inverter 18 is capable of outputting is $f=f_0/2$, which is ½ times the control frequency $f_0$. That is to say, by performing heating of the rotating body 103 by AC magnetic field at a frequency that is greater than two times the control frequency of the motor inverter controller 20, heating can be performed with an AC magnetic field of a frequency that is greater in comparison with a case of heating the rotating body 103 by the motor inverter 18 applying AC electric current superimposed on the electric current flowing through the motor 121, and generating an AC magnetic field for heating superimposed on the magnetic fields of the motor 121.

Accordingly, the magnetic flux density of the AC magnetic field for obtaining the same eddy current loss at the rotating body 103 can be made smaller, the external force generated at the rotating body 103 by the AC magnetic field can be made smaller, and vibration of the rotating body 103 can be made smaller.

Further, this point is the same regarding PWM control using the magnetic bearing inverter 16 for controlling the magnetic bearing. A timing chart thereof is the same as that in FIG. 6, and accordingly illustration will be omitted. PWM control for controlling the magnetic bearing is also performed in cycles to, in the same way as in FIG. 6. That is to say, by performing heating of the rotating body 103 by AC magnetic field at a frequency that is greater than two times the control frequency of the magnetic bearing inverter controller 22, heating can be performed with an AC magnetic field of a frequency that is greater in comparison with a case of heating the rotating body 103 by the magnetic bearing inverter 16 applying AC electric current superimposed on the electric current flowing through the magnetic bearing, and generating an AC magnetic field for heating superimposed on the magnetic fields of the magnetic bearing. Accordingly, the magnetic flux density of the AC magnetic field for obtaining the same eddy current loss at the rotating body 103 can be made smaller, whereby the external force generated at the rotating body 103 by the AC magnetic field can be made smaller, and vibration of the rotating body 103 can be made smaller.

Further, inductor sensors or eddy current sensors are used for the lower-side radial-direction sensors 108 and the upper-side radial-direction sensors 107. Modulation waves of a predetermined sensor frequency are superimposed on the displacement signals detected at the lower-side radial-direction sensors 108 and the upper-side radial-direction sensors 107, and a suitable frequency for the AC magnetic fields generated at the heating electromagnet 3A and the heating electromagnet 3B is determined on the basis of the modulation waves.

Figure 7:
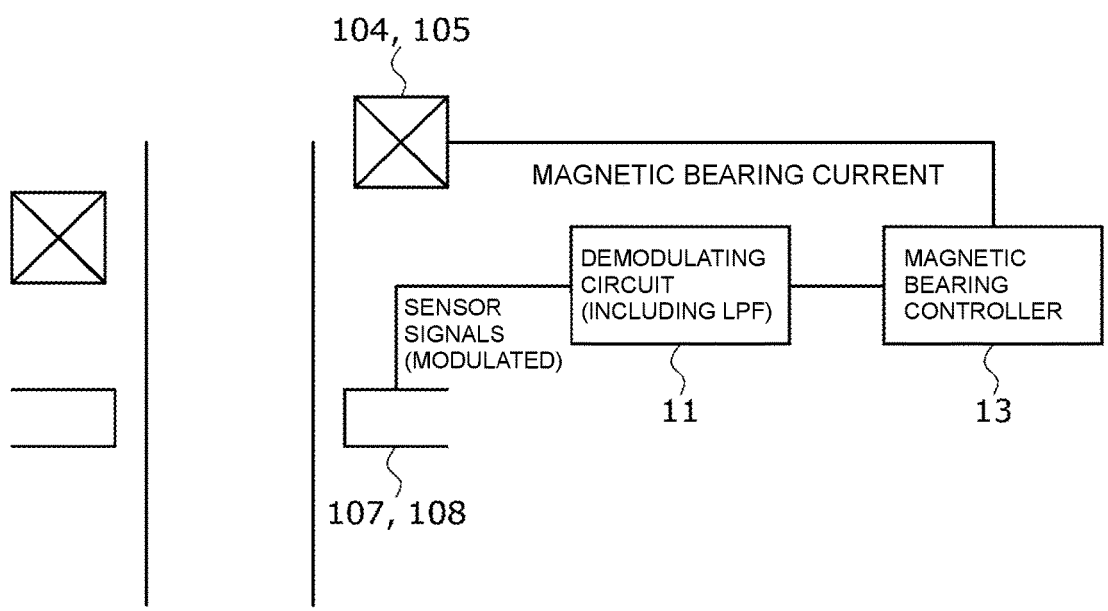
FIG. 7 is a diagram for describing cutoff frequency by a lowpass filter when extracting position signals.

In FIG. 7, position signals output from the lower-side radial-direction sensors 108 and the upper-side radial-direction sensors 107 are demodulated at a demodulating circuit 11 including a low-pass filter (LPF), then subjected to signal adjustment at a magnetic bearing controller 13, and subsequently are used to perform excitation driving of the lower-side radial-direction electromagnets 105 and the upper-side radial-direction electromagnets 104. If the frequency of the AC magnetic fields generated at the heating electromagnet 3A and the heating electromagnet 3B is greater than a cutoff frequency of the low-pass filter (a frequency 3 dB lower than a nominal passband), the vibration component of the pump generated by the AC magnetic field, included in the demodulated position signals from the displacement sensors becomes small. Accordingly, vibration of the pump generated by the AC magnetic field does not affect position control of the rotating body 103, and magnetic bearing control that is more stable can be realized.

Also, if the frequency of the AC magnetic fields generated at the heating electromagnet 3A and the heating electromagnet 3B is greater than the sensor frequency, the vibration component of the pump generated by the AC magnetic field included in the position signals of the displacement sensors becomes smaller. Accordingly, vibration of the pump generated by the AC magnetic field does not affect position control of the rotating body 103, and magnetic bearing control that is more stable can be realized.

Figure 8:
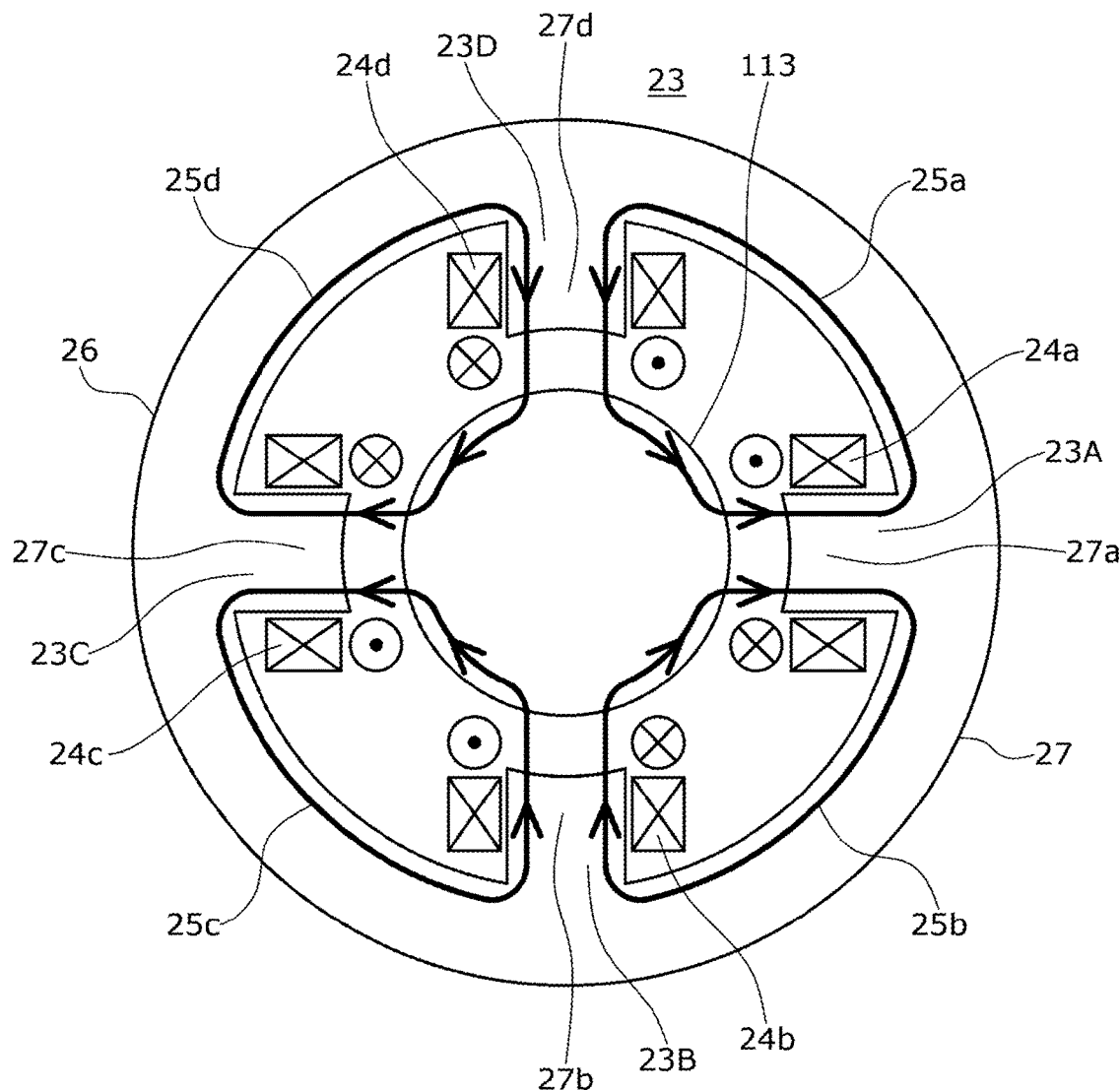
FIG. 8 is a configuration example of a heating device using four poles.

While an example of the heating device 3 configured of the two poles of the heating electromagnet 3A and the heating electromagnet 3B has been illustrated in FIGS. 1 and 2, a configuration example of a heating device using four poles is illustrated in FIG. 8. In this case, as a heating device 23, a heating electromagnet 23A, a heating electromagnet 23B, a heating electromagnet 23C, and a heating electromagnet 23D are disposed around the rotor shaft 113 at 90 degrees intervals each, and coils 24a, 24b, 24c, and 24d are laid out uniformly as to protruding pole portions 27a, 27b, 27c, and 27d of a core 26. The magnetic fields pass through the rotor shaft 113, thereby forming closed loops 25a, 25b, 25c, and 25d of four magnetic fields passing through the protruding pole portions 27a, 27b, 27c, and 27d around the rotor shaft 113.

Figure 9:
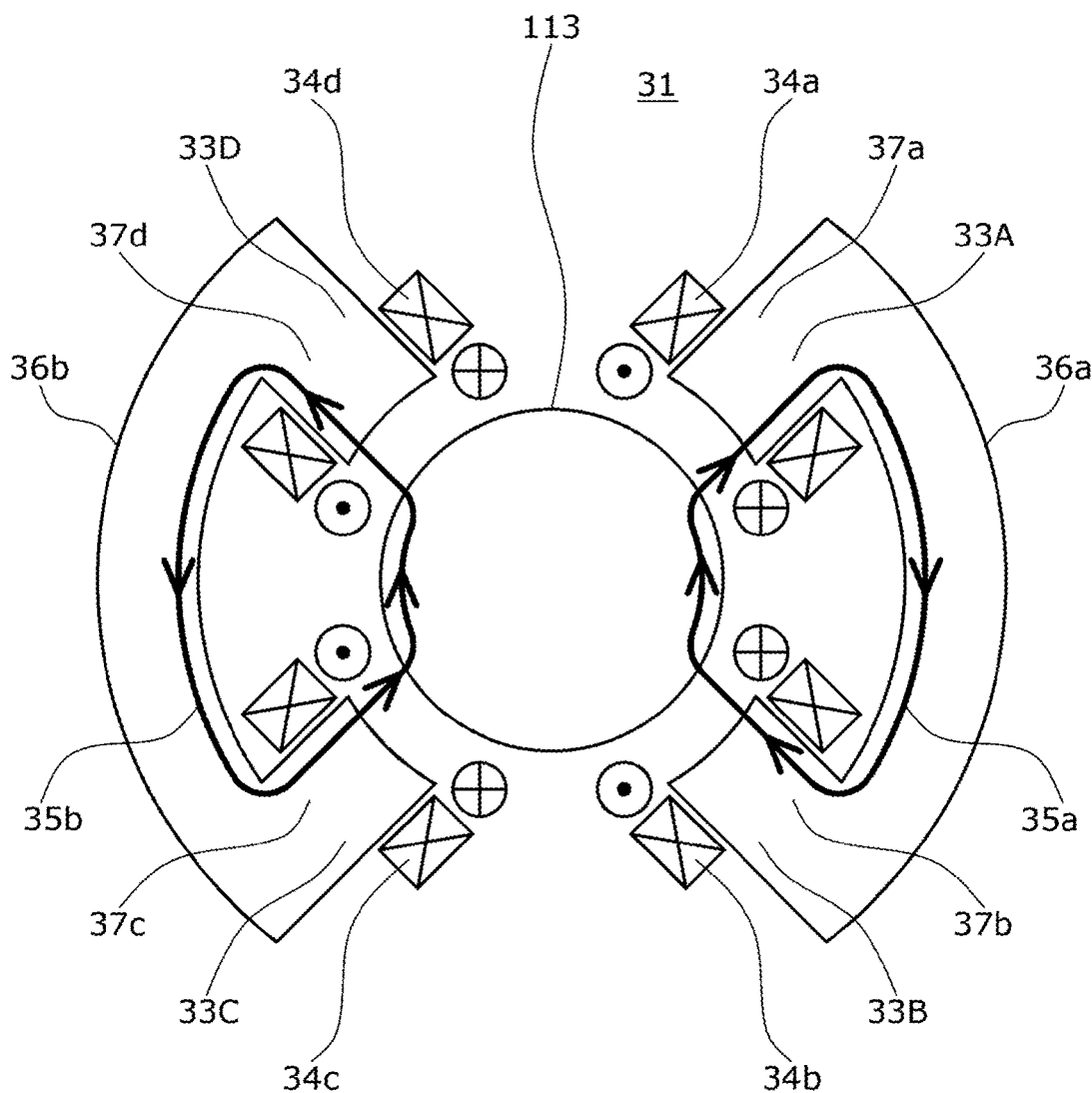
FIG. 9 is a separate configuration example of a heating device using four poles.

Also, FIG. 9 illustrates a separate configuration example of a heating device using four poles. In this case, as a heating device 31, a heating electromagnet 33A and a heating electromagnet 33B, made up of coils 34a and 34b respectively disposed on two protruding pole portions 37a and 37b of a core 36a that has a letter-U shape, form a closed loop 35a of a magnetic field in an X-axis positive direction, while a heating electromagnet 33C and a heating electromagnet 33D, made up of coils 34c and 34d respectively disposed on two protruding pole portions 37c and 37d of a core 36b that has a letter-U shape, form a closed loop 35b of a magnetic field in an X-axis negative direction.

Figure 10:
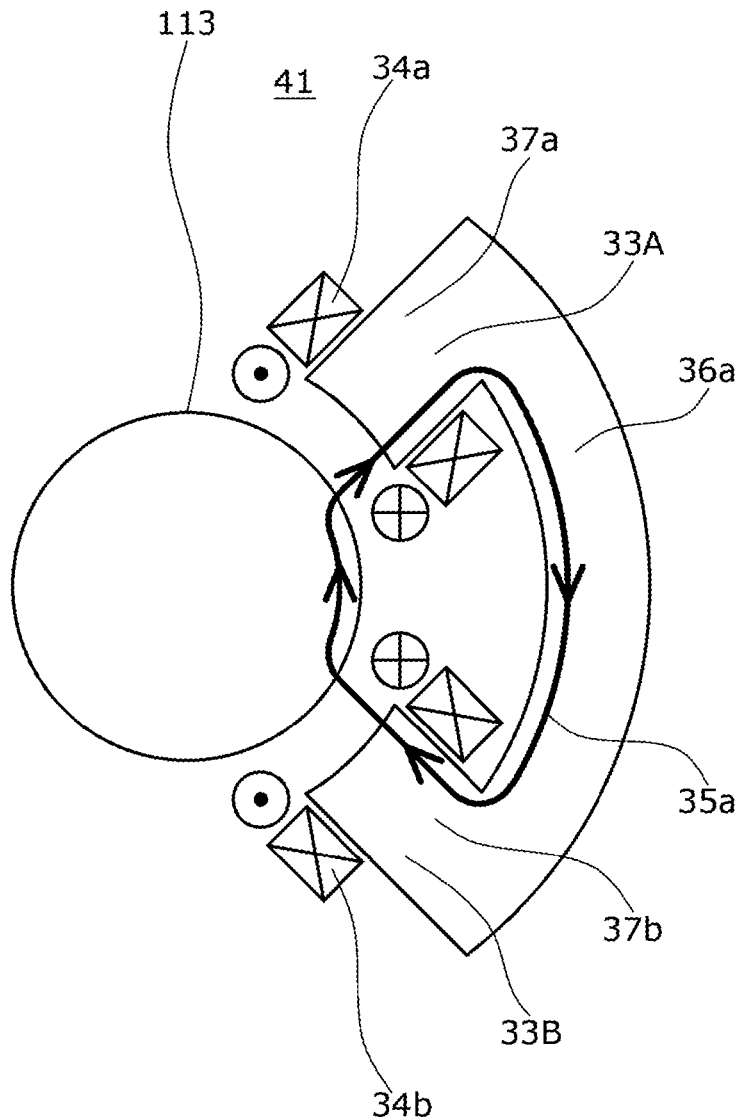
FIG. 10 is a separate configuration example of a heating device using two poles.

Further, FIG. 10 illustrates a separate configuration example of a heating device using two poles. In this case, as a heating device 41, the heating electromagnet 33A and the heating electromagnet 33B, made up of the coils 34a and 34b respectively disposed on the two protruding pole portions 37a and 37b of the core 36a that has a letter-U shape, form the closed loop 35a of the magnetic field in the X-axis positive direction alone. In this way, eddy current loss $P_e$ can be generated around an AC magnetic field intersecting the rotating body 103 even in a case of such an asymmetrical configuration.

Coils of the heating electromagnets are preferably connected in series to a single heating electric power source. However, coils of the heating electromagnets may be connected in parallel, a plurality of heating electric power sources may be provided for the coils, and so forth.

Also, the material of the core for the heating electromagnets preferably is a material that has low electric conductivity and high magnetic permeability, such as laminated steel sheets or ferrite. However, normal iron or stainless steel, for example, may be used. This configuration is useful in heating the stator side at the same time as the rotating body. Also, nonmagnetic metal such as aluminum or the like, insulators such as plastic or the like, may be used, or air-core coils that do not use core material may be used as the heating electromagnets.

Next, an installation method of the heating device to the turbomolecular pump 100 will be described with reference to FIG. 11. First, the heating device 41 to be disposed at a position indicated by an arrow A in FIG. 11 has a coil 43 that is wound in one direction around the rotor shaft 113, as illustrated in FIG. 12. Also, a groove is cut in an outer circumferential face of the rotor shaft 113, and a heating object 45 that has electroconductivity is embedded in this groove. AC electric current is applied to the coil 43, generating an AC magnetic field at a perimeter thereof. This AC magnetic field intersects with the heating object 45, thereby generating an eddy current at the heating object 45, and eddy current loss $P_e$ can be generated by this eddy current. Accordingly, the heating object 45 generates heat. Efficient heating of the rotating body 103 can be performed, since the heating object 45 can be directly heated, unlike heating by radiant heat and so forth when conventionally heating the base portion 129.

Figure 11:
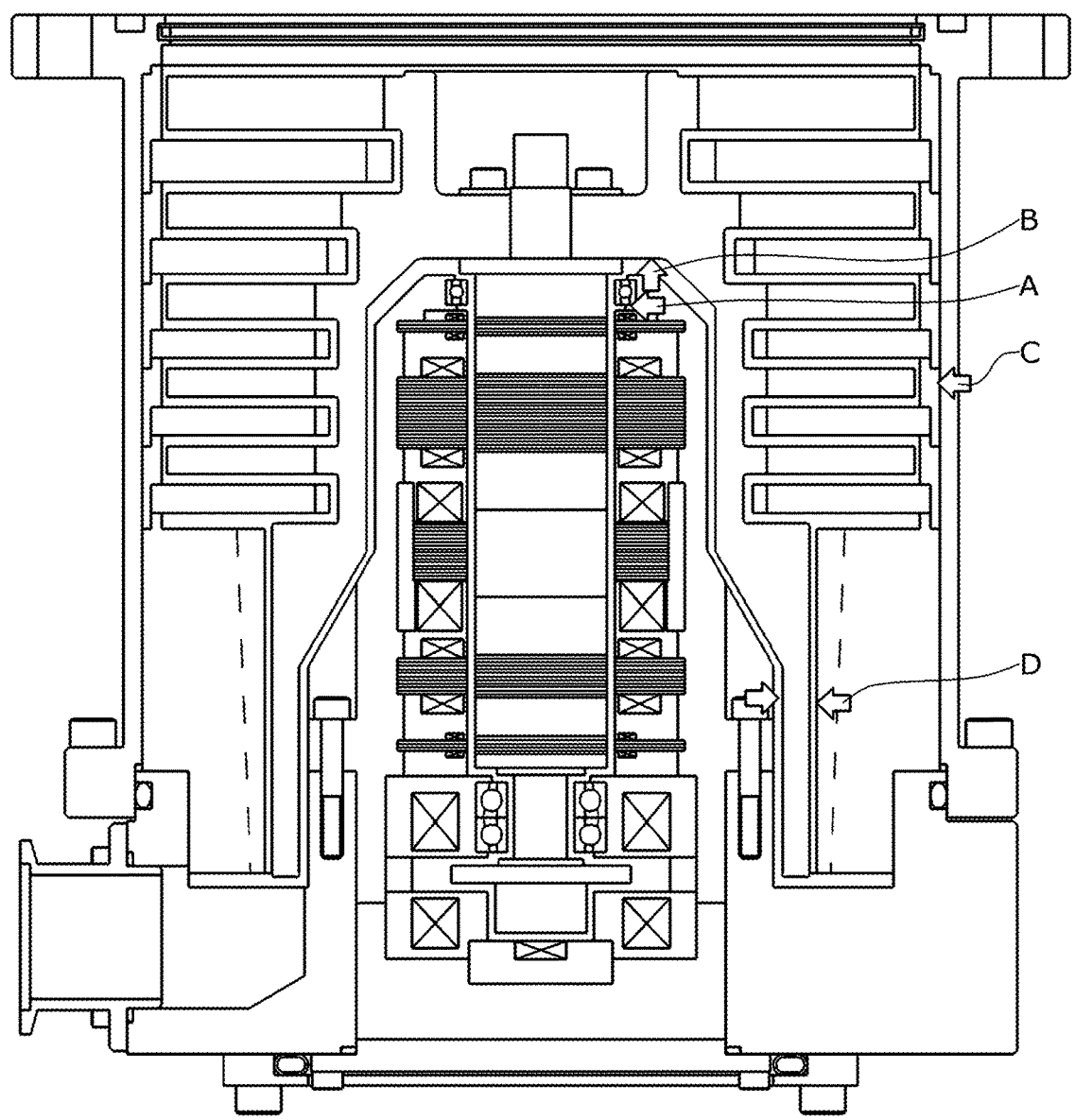
FIG. 11 is a diagram for describing an installation method of the heating device to the turbomolecular pump.
Figure 12:
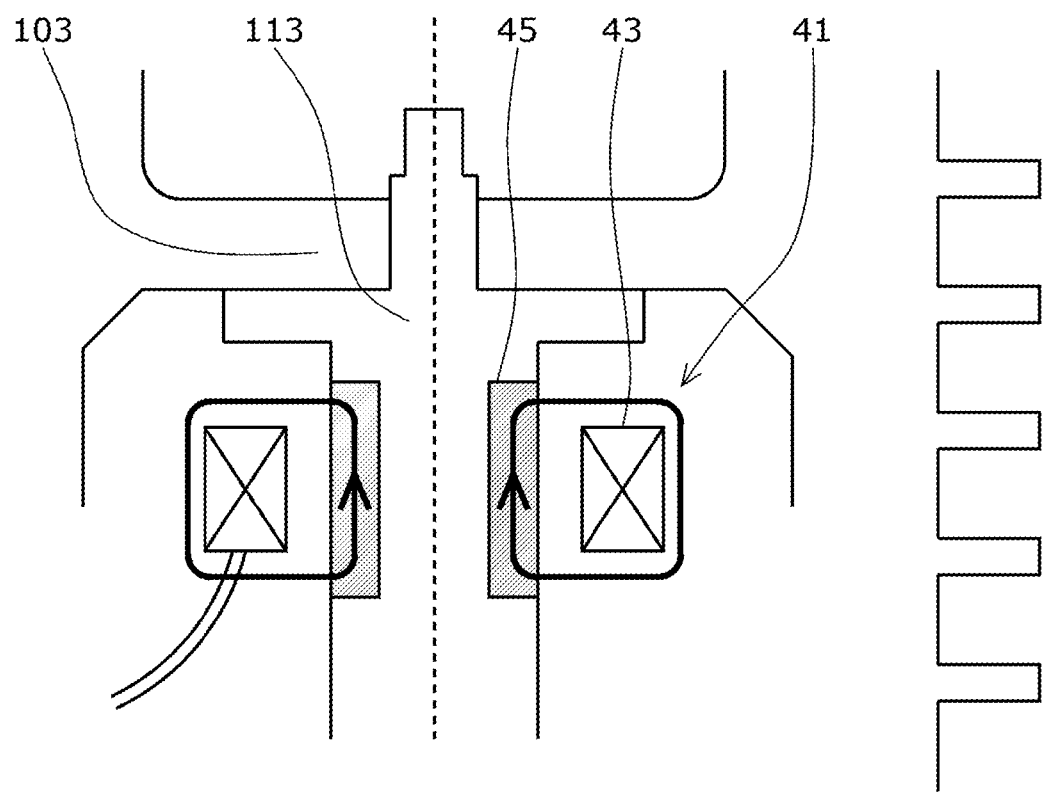
FIG. 12 is a configuration diagram of a heating device disposed at a position indicated by arrow A in FIG. 11.
Figure 13:
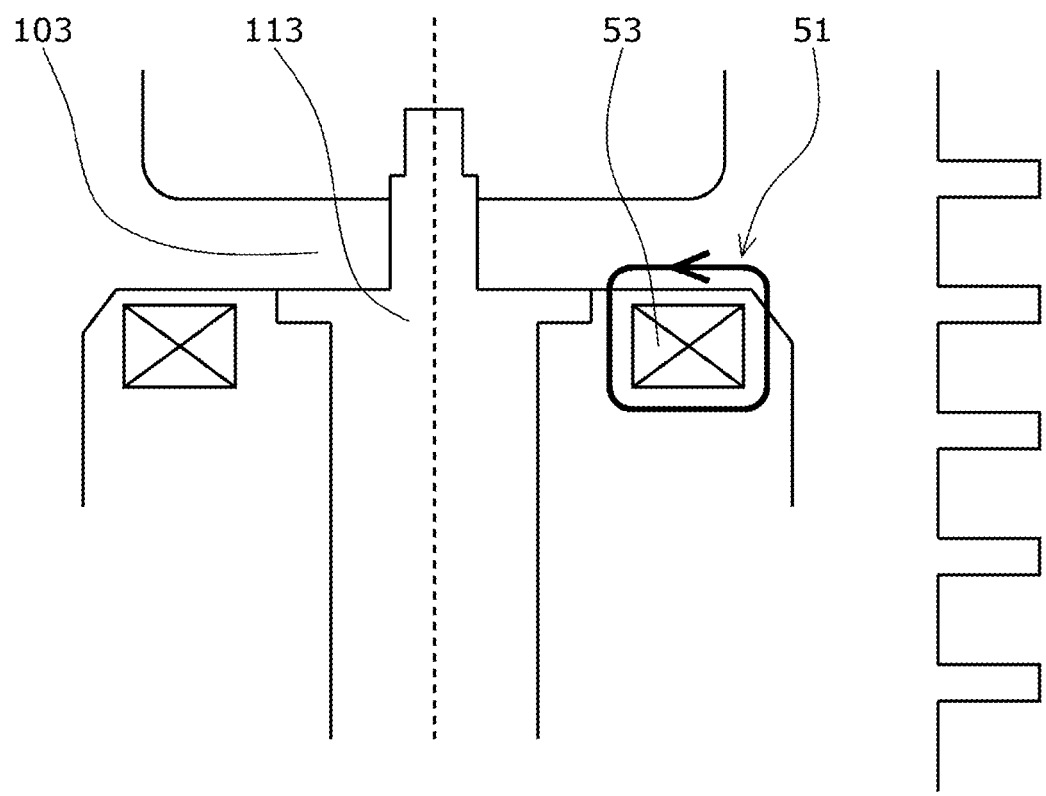
FIG. 13 is a configuration diagram of a heating device disposed at a position indicated by arrow B in FIG. 11.

Also, a heating device 51 to be disposed at a position indicated by an arrow B in FIG. 11 is configured with a coil 53 wound in one direction around the rotor shaft 113, as illustrated in FIG. 13. AC electric current is applied to the coil 53, generating an AC magnetic field at the perimeter thereof. This AC magnetic field intersects with the rotor blades 102, thereby generating an eddy current at the rotor blades 102, and eddy current loss $P_e$ can be generated by this eddy current. Accordingly, the rotor blades 102 generate heat. The rotor blades 102 can be directly heated, and accordingly, efficient heating of the rotating body 103 can be performed.

Figure 14:
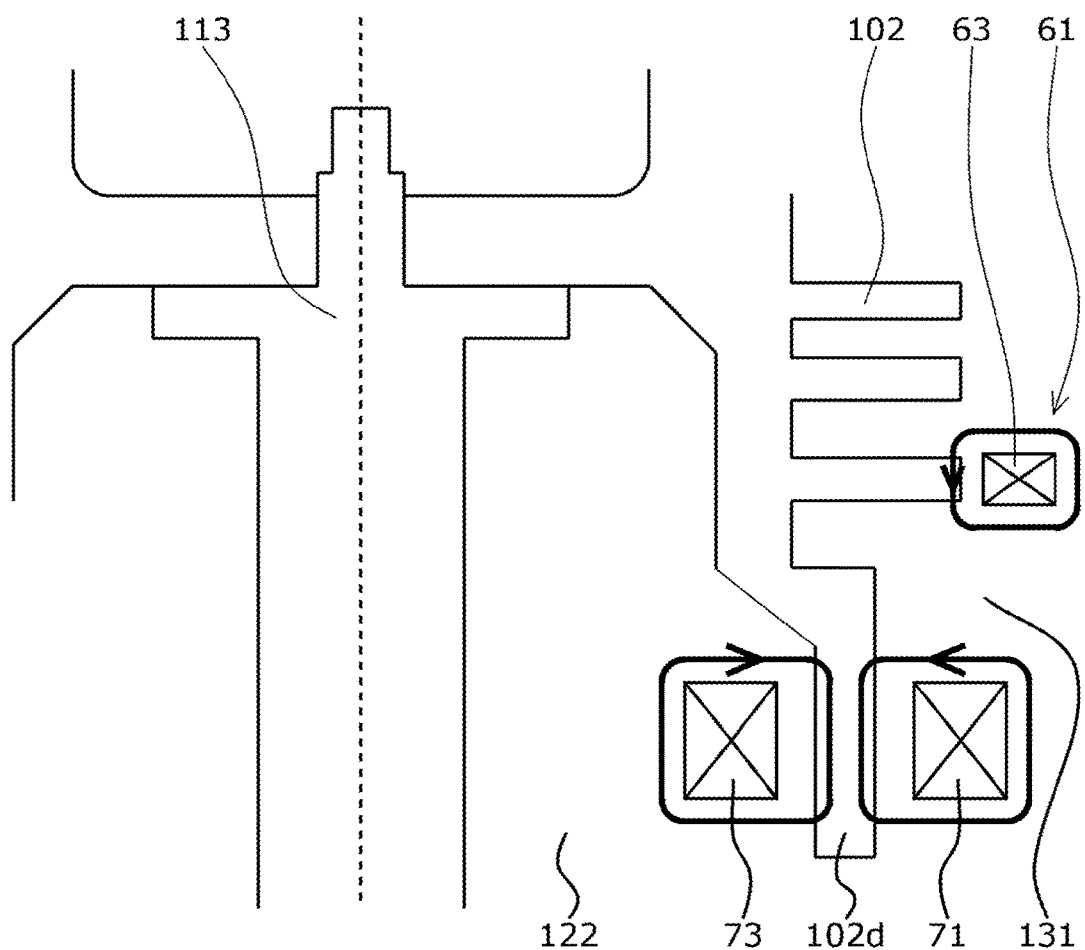
FIG. 14 is a configuration diagram of heating devices disposed at positions indicated by arrows C and D in FIG. 11.

Further, a heating device 61 to be disposed at a position indicated by an arrow C in FIG. 11 is configured by a coil 63 being wound in one direction around the rotor shaft 113, inside of the stator blade spacers 125 or the outer cylinder 127, as illustrated in FIG. 14. AC electric current is applied to the coil 63, generating an AC magnetic field at a perimeter thereof. This AC magnetic field intersects with the rotor blades 102, thereby generating an eddy current at the rotor blades 102, and eddy current loss $P_e$ can be generated by this eddy current. Accordingly, the rotor blades 102 generate heat. The rotor blades 102 can be directly heated, and accordingly, efficient heating of the rotating body 103 can be performed.

Further, a heating device 71 to be disposed at a position indicated by an arrow D in FIG. 11 is configured by a coil 71 being wound in one direction around the rotor shaft 113, inside of the threaded spacer 131, as illustrated in FIG. 14. AC electric current is applied to the coil 71, generating an AC magnetic field at a perimeter thereof. This AC magnetic field intersects with the cylindrical portion 102d of the rotor blades 102, thereby generating an eddy current at the rotor blades 102, and eddy current loss $P_e$ can be generated by this eddy current. Accordingly, the rotor blades 102 generate heat. The rotor blades 102 can be directly heated, and accordingly, efficient heating of the rotating body 103 can be performed. Note however, that a coil 73 may be embedded on the stator column 122 side. Eddy current loss $P_e$ may be generated by causing the AC magnetic field generated at the coil 73 to intersect with the cylindrical portion 102d of the rotor blades 102.

Figure 15:
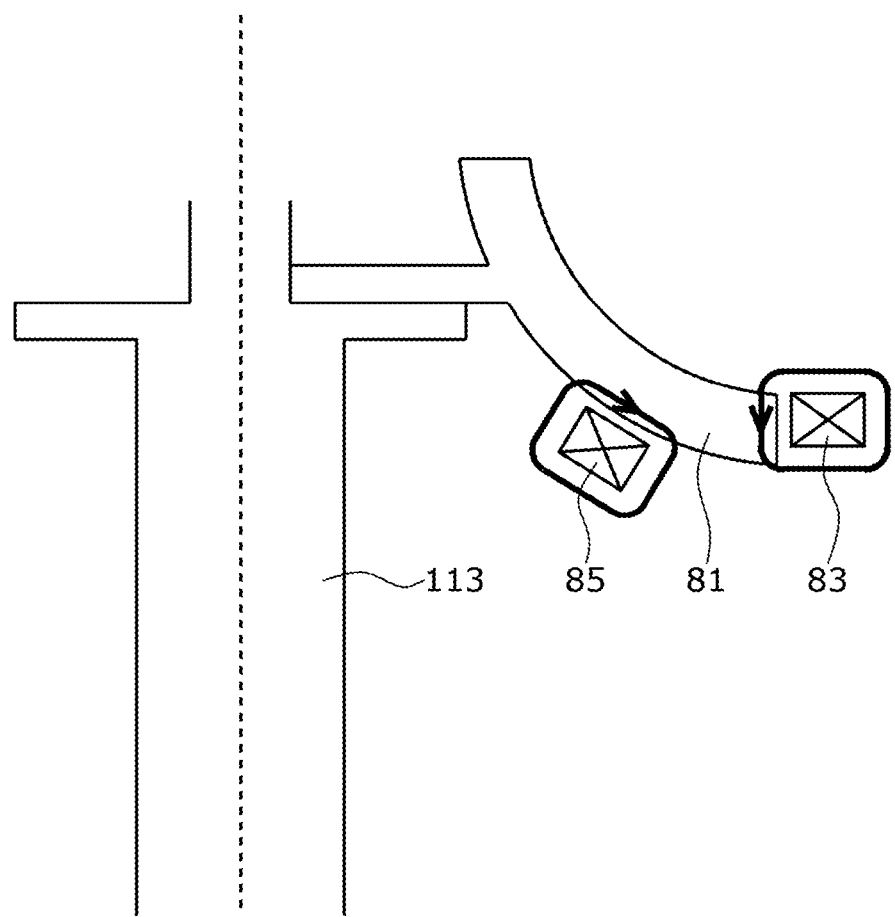
FIG. 15 is an example of applying a heating device to a centrifugal pump.

Next, a case of applying the heating device according to the present disclosure to a centrifugal pump will be described. As illustrated in FIG. 15, a plurality of vanes 81 is attached to a head portion of the rotor shaft 113. A coil 83 is disposed on the stator side, so as to face tip end portions of the vanes 81. AC electric current is applied to the coil 83, generating an AC magnetic field at a perimeter thereof. This AC magnetic field intersects with the tip end portions of the vanes 81, thereby generating an eddy current at the tip end portions of the vanes 81, and eddy current loss $P_e$ can be generated by this eddy current. Accordingly, the vanes 81 generate heat. Note that a coil 85 may be disposed so as to face side portions of the vanes 81, in order to heat the side portions of the vanes 81. In this case, the AC magnetic field generated at the coil 85 intersects the side portions of the vanes 81. Accordingly, an eddy current is generated at the side portions of the vanes 81, and eddy current loss $P_e$ can be generated by this eddy current.

Figure 16:
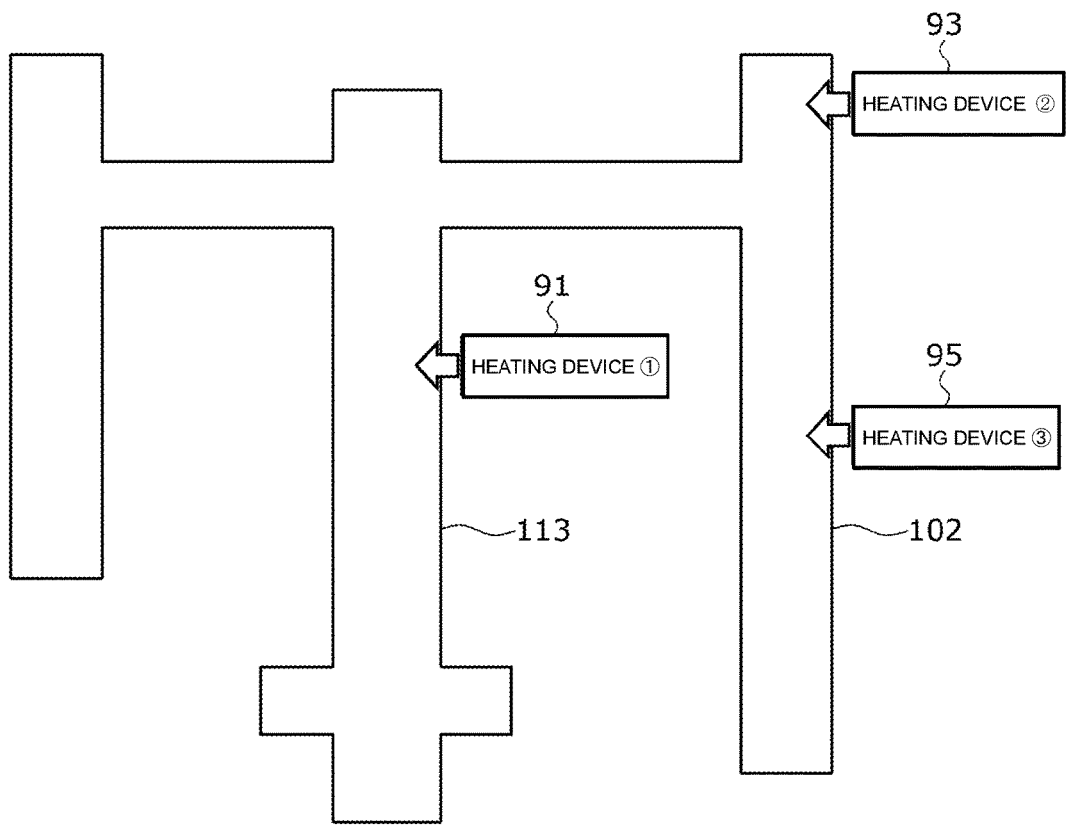
FIG. 16 is an example of disposing heating devices at a plurality of positions in a pump.
Figure 17:
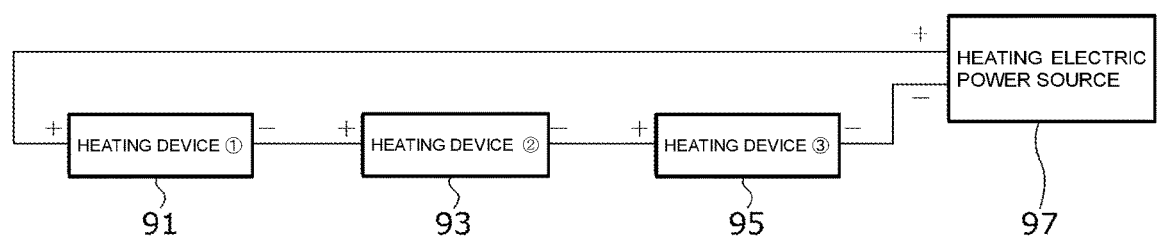
FIG. 17 is an example of supplying AC electric current with the heating devices connected in series to each other.
Figure 18:
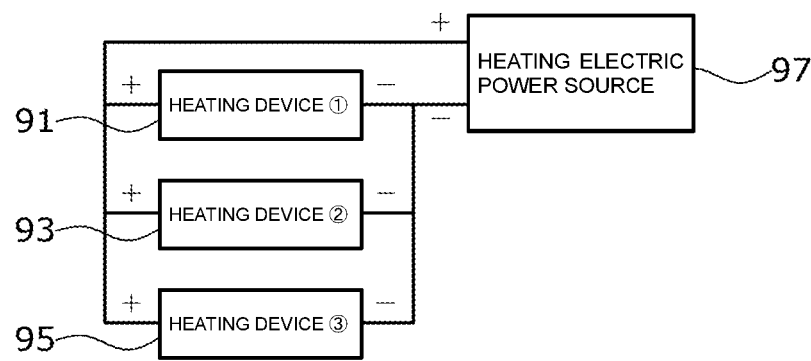
FIG. 18 is an example of supplying AC electric current with the heating devices connected in parallel to each other.
Figure 19:
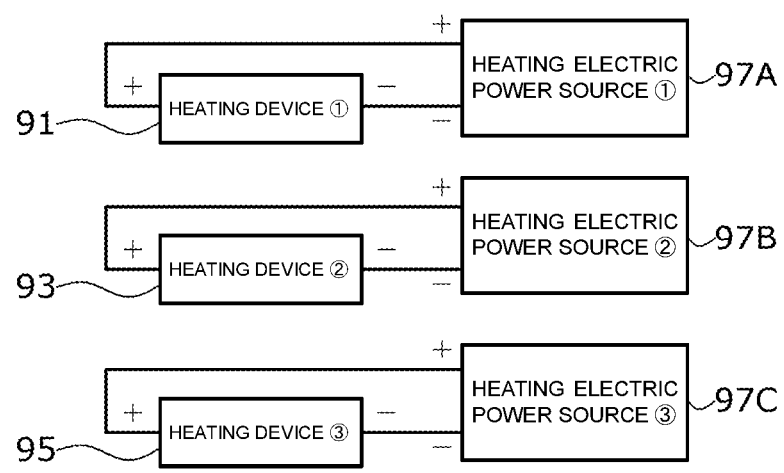
FIG. 19 is an example of disposing heating electric power sources independently for each of heating devices.

Next, a method of connecting a heating electric power source when installing the heating device according to the present disclosure in a plurality of positions in a pump will be described. FIG. 16 illustrates an example in which a heating device 91 is disposed for heating the rotor shaft 113, while a heating device 93 and a heating device 95 are disposed at two positions distanced from each other in the axial direction, for heating the rotor blades 102. A heating electric power source 97 may supply AC electric current with the heating device 91, the heating device 93, and the heating device 95 connected in series to each other as illustrated in FIG. 17, or may supply AC electric current with the heating device 91, the heating device 93, and the heating device 95 connected in parallel to each other as illustrated in FIG. 18. Alternatively, heating electric power sources 97A, 97B, and 97C may be independently disposed for the heating device 91, the heating device 93, and the heating device 95, respectively, as illustrated in FIG. 19, and supply AC electric current thereto.

Figure 20:
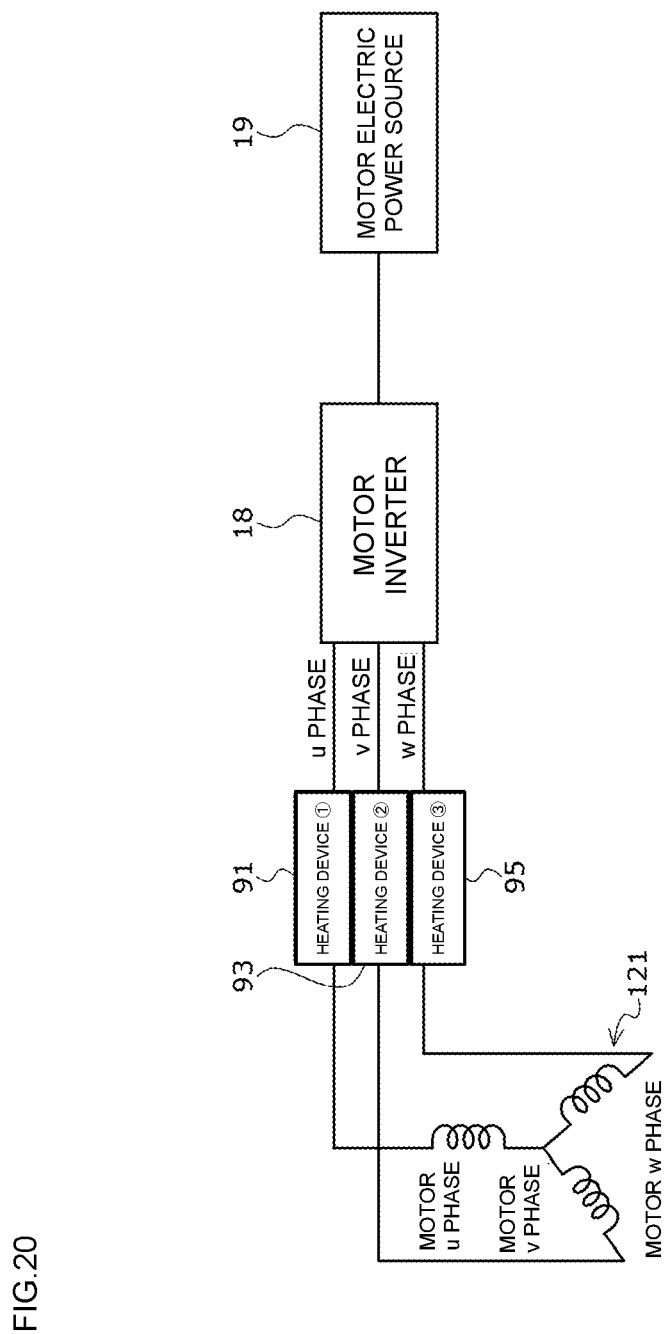
FIG. 20 is an example of a motor electric power source serving also as a heating electric power source.

Also, an arrangement may be made in which the heating device 91 is connected partway along a U-phase cable of the motor 121, the heating device 93 is connected partway along a V-phase cable thereof, and the heating device 95 is connected partway along a W-phase cable thereof, as illustrated in FIG. 20. In this case, a motor electric power source 19 and the motor inverter 18 also serve as a heating electric power source. AC electric current is supplied to the heating device 91, the heating device 93, and the heating device 95, from the motor electric power source 19 and the motor inverter 18. In this case, preferably, heating devices of the same resistance and inductance are connected in series for the three respective phases of the motor. However, arrangements may be made in which connection is made to only a certain phase of the motor, connection of the motor and the heating devices is in parallel, or the resistance or inductance differs for each heating device.

This point is the same for a magnetic bearing electric power source 17, although omitted from illustration, and the magnetic bearing electric power source 17 may be configured to also serve as a heating electric power source.

The heating electric power source can be configured of an inverter, an LC resonant circuit, a linear amplifier, or the like. Also, the heating electric power source may have a configuration in which an inverter is disposed in parallel to the motor inverter and the output thereof is connected to the heating device, thereby supplying electric power of the motor electric power source to the heating device, for example. Alternatively, in a case in which the motor electric power source is an AC commercial electric power source, for example, the motor electric power source may be directly connected to the heating device so as to be used as the heating electric power source. A similar configuration is conceivable in a case of doubling as the magnetic bearing electric power source and the heating electric power source.

Note that the various modifications of the present disclosure may be made without departing from the spirit of the present disclosure, and it goes without saying that the present disclosure encompasses such modifications as a matter of course. Also, the above-described examples may be various combined.

The invention claimed is:

1. A vacuum pump, comprising:
   a rotating body;
   a motor that rotationally drives the rotating body;
   a motor electric power source that supplies electric power to the motor for rotational driving;
   a heating electromagnet that generates an alternating current (AC) magnetic field of a predetermined magnetic field frequency, to heat the rotating body; and
   a heating electric power source that supplies electric power by AC electric current to the heating electromagnet;
   a magnetic bearing that supports the rotating body in air by levitation;
   a magnetic bearing electric power source that supplies electric power to the magnetic bearing;
   a magnetic bearing inverter that converts output voltage of the magnetic bearing electric power source, and that applies voltage to the magnetic bearing; and
   a magnetic bearing inverter controller that controls the magnetic bearing inverter, wherein:
   the AC magnetic field generated at the heating electromagnet is made to intersect with the rotating body, thereby generating an eddy current at the rotating body, at a perimeter of the AC magnetic field that intersects the rotating body, and
   the magnetic field frequency is greater than half of a control frequency of the magnetic bearing inverter controller.

2. The vacuum pump according to claim 1, wherein the heating electric power source also serves as the magnetic bearing electric power source.

3. The vacuum pump of claim 1, wherein the rotating body includes a heating object that has a predetermined electroconductivity and that is an object of intersection of the AC magnetic field.

4. The vacuum pump according to claim 1, wherein the heating electric power source also serves as the motor electric power source.

5. A vacuum pump, comprising:
   a rotating body:
   a motor that rotationally drives the rotating body;
   a motor electric power source that supplies electric power to the motor for rotational driving;
   a heating electromagnet that generates an alternating current (AC) magnetic field of a predetermined magnetic field frequency, to heat the rotating body; and
   a heating electric power source that supplies electric power by AC electric current to the heating electromagnet;
   a magnetic bearing that supports the rotating body in air by levitation;
   a magnetic bearing electric power source that supplies electric power to the magnetic bearing;
   a displacement sensor that measures a position of the rotating body by non-contact on the basis of a position signal modulated by a predetermined sensor frequency; and
   a demodulation circuit that includes a low-pass filter for demodulating the position signal, wherein:
   the AC magnetic field generated at the heating electromagnet is made to intersect with the rotating body, thereby generating an eddy current at the rotating body, at a perimeter of the AC magnetic field that intersects the rotating body, and
   the magnetic field frequency is greater than a cutoff frequency of the low-pass filter.

6. The vacuum pump of claim 5, wherein the heating electric power source also serves as the motor electric power source.

7. The vacuum pump of claim 5, wherein the rotating body includes a heating object that has a predetermined electroconductivity and that is an object of intersection of the AC magnetic field.

8. The vacuum pump of claim 5, wherein the heating electric power source also serves as the magnetic bearing electric power source.

9. A vacuum pump, comprising:
   a rotating body:
   a motor that rotationally drives the rotating body;
   a motor electric power source that supplies electric power to the motor for rotational driving;
   a heating electromagnet that generates an alternating current (AC) magnetic field of a predetermined magnetic field frequency, to heat the rotating body; and
   a heating electric power source that supplies electric power by AC electric current to the heating electromagnet;
   a magnetic bearing that supports the rotating body in air by levitation;
   a magnetic bearing electric power source that supplies electric power to the magnetic bearing; and
   a displacement sensor that measures a position of the rotating body by non-contact on the basis of a position signal modulated by a predetermined sensor frequency, wherein:
   the AC magnetic field generated at the heating electromagnet is made to intersect with the rotating body, thereby generating an eddy current at the rotating body, at a perimeter of the AC magnetic field that intersects the rotating body, and the magnetic field frequency is greater than the sensor frequency.

10. The vacuum pump of claim 9, wherein the heating electric power source also serves as the motor electric power source.

11. The vacuum pump of claim 9, wherein the rotating body includes a heating object that has a predetermined electroconductivity and that is an object of intersection of the AC magnetic field.

12. The vacuum pump of claim 9, wherein the heating electric power source also serves as the magnetic bearing electric power source.

* * * * *